United States Patent
Ridlington et al.

(10) Patent No.: US 11,514,525 B2
(45) Date of Patent: Nov. 29, 2022

(54) METHOD, SYSTEM AND COMPUTER PROGRAM PRODUCT FOR PROVIDING AUTOMATED ADVICE

(71) Applicant: WEALTH WIZARDS LIMITED, Leamington Spa (GB)

(72) Inventors: Peter Ridlington, Leamington Spa (GB); Gavin Audley, Leamington Spa (GB); Joe Dods, Leamington Spa (GB)

(73) Assignee: WEALTH WIZARDS LIMITED, Leamington Spa (GB)

( * ) Notice: Subject to any disclaimer, the term of this patent is extended or adjusted under 35 U.S.C. 154(b) by 0 days.

(21) Appl. No.: 16/978,806

(22) PCT Filed: Mar. 5, 2019

(86) PCT No.: PCT/GB2019/050605
§ 371 (c)(1),
(2) Date: Sep. 8, 2020

(87) PCT Pub. No.: WO2019/171040
PCT Pub. Date: Sep. 12, 2019

(65) Prior Publication Data
US 2020/0410596 A1     Dec. 31, 2020

(30) Foreign Application Priority Data

Mar. 7, 2018   (GB) .................................. 1803677.2
Mar. 8, 2018   (GB) .................................. 1803730.9

(51) Int. Cl.
*G06Q 40/06* (2012.01)
*G06F 40/18* (2020.01)

(52) U.S. Cl.
CPC ............. *G06Q 40/06* (2013.01); *G06F 40/18* (2020.01)

(58) Field of Classification Search
None
See application file for complete search history.

(56) References Cited

U.S. PATENT DOCUMENTS

| | | | | |
|---|---|---|---|---|
| 6,430,542 B1 * | 8/2002 | Moran | ............... | G06Q 30/02 705/35 |
| 7,016,873 B1 * | 3/2006 | Peterson | ............... | G06Q 40/02 705/37 |

(Continued)

FOREIGN PATENT DOCUMENTS

EP   1081642 A2   3/2001

OTHER PUBLICATIONS

Automated financial advice moves online. (1998). Wall Street & Technology, 16, p. 24(1). Retrieved from https://dialog.proquest.com/professional/docview/1092127358?accountid=131444 on Jul. 13, 2022 (Year: 1998).*

(Continued)

*Primary Examiner* — Kito R Robinson
(74) *Attorney, Agent, or Firm* — Saul Ewing Arnstein & Lehr LLP

(57) ABSTRACT

Disclosed is a computer implemented method of providing automated advice including receiving factors for use in providing automated advice, each factor including a defined respective set of categories, and each factor and each category including a respective initial weighting; receiving a rule for generating a recommendation and using the respective weightings of the factors and categories, the rule including a set of possible recommendations such that a generated recommendation is one of the set of possible recommendations; receiving training cases, each training case including inputs relating to each factor, and to the categories, and including a respective validated recommendation; processing the training cases, to derive a respective optimized weighting for each factor and for each category, to satisfy or (Continued)

to match the respective validated recommendations optimally, using the rule, and storing the derived respective optimized weightings for the factors and for each category.

19 Claims, 50 Drawing Sheets

(56) References Cited

U.S. PATENT DOCUMENTS

| | | | | |
|---|---|---|---|---|
| 7,249,080 | B1* | 7/2007 | Hoffman | G06Q 40/00 |
| | | | | 705/35 |
| 7,401,040 | B2 | 7/2008 | Sloan et al. | |
| 2003/0004846 | A1* | 1/2003 | Schneider | G06Q 40/06 |
| | | | | 705/36 R |
| 2003/0126054 | A1* | 7/2003 | Purcell, Jr. | G06Q 40/06 |
| | | | | 705/36 R |
| 2009/0319438 | A1 | 12/2009 | Jain | |

OTHER PUBLICATIONS

Exploring the future of digital financial advice: New findings from CFP board, financial services and technology leaders: Scenario planning reveals four potential . . . paths for revolution of financial advice. (Dec. 15, 2016). U.S.Newswire Retrieved from https://dialog.proquest.com/professional/docview/18488 on Jul. 13, 2022 (Year: 2016).*

International Search Report, dated Jul. 30, 2019, issued in International Application No. PCT/GB2019/050605.

* cited by examiner

| Apple | Cost |
|---|---|
| 1 | 70p |
| 2 | 35p |
| 3 | £1.05 |
| Decision: Apple 2 | |

FIGURE 2A

| Apple | Cost | Redness |
|---|---|---|
| 1 | 70p | 3 |
| 2 | 35p | 1 |
| 3 | £1.05 | 2 |

FIGURE 2B

| Apple | Cost | Redness | Score |
|---|---|---|---|
| | 3 | 1 | |
| 1 | 50% | 100% | 2.5 |
| 2 | 100% | 0% | 3 |
| 3 | 0% | 50% | 0.5 |
| Decision: Apple 2 | | | |

FIGURE 3A

| Apple | Cost | Colour | Freshness | Score |
|---|---|---|---|---|
| | 3 | 1 | 10 | |
| 1 | 50% | 100% | 100% | 12.5 |
| 2 | 100% | 0% | 0% | 3 |
| 3 | 0% | 50% | 100% | 10.5 |
| Decision: Apple 1 | | | | |

FIGURE 3B

| | Nissan Leaf | Tesla Model S | Chevy Volt | Fisker Karma<br>Plug-in Hybrid | Toyota Prius<br>Plug-in Hybrid |
|---|---|---|---|---|---|
| | $28,550-30,600 | $50,800-98,800 | $32,495 | $94,500-107,500 | $30,260-37,785 |
| | 73 | 265 | 38 | 33 | 11 |
| | 99 | 89 | 98 | 54 | 95 |
| | $600 | $700 | $950 | £1,800 | $1,000 |

FIGURE 4

| Factor | Weighting | Leaf | Model S | Volt | Karma | Prius |
|---|---|---|---|---|---|---|
| Cost | 5 | 100% | 10% | 80% | 0% | 70% |
| Range | 7 | 100% | 80% | 100% | 0% | 90% |
| Comfort | 3 | 0% | 80% | 50% | 60% | 100% |
| Prestige | 6 | 10% | 90% | 20% | 100% | 50% |
| Self-Driving Tech | 3 | 0% | 100% | 0% | 20% | 0% |
| Top Speed | 4 | 0% | 80% | 10% | 100% | 15% |
| Acceleration | 5 | 0% | 90% | 15% | 100% | 20% |
| User Reviews | 8 | 50% | 100% | 0% | 40% | 70% |
| Score | | 16.6 | 32.6 | 14.85 | 20.6 | 23 |

FIGURE 5

| Factor | Person 1 Weighting | Person 2 Weighting | Combined Model |
|---|---|---|---|
| Cost | 5 | 19 | 24 |
| Range | 7 | 2 | 9 |
| Comfort | 3 | 8 | 11 |
| Prestige | 6 | 0 | 6 |
| Self-Driving Tech | 3 | 0 | 3 |
| Top Speed | 4 | 0 | 4 |
| Acceleration | 5 | 0 | 5 |
| User Reviews | 8 | 10 | 18 |

FIGURE 6

| Factor | Weighting | Leaf | Model S | Volt | Karma | Prius |
|---|---|---|---|---|---|---|
| Cost | 24 | 100% | 10% | 80% | 0% | 70% |
| Range | 9 | 100% | 80% | 100% | 0% | 90% |
| Comfort | 11 | 0% | 80% | 50% | 60% | 100% |
| Prestige | 6 | 10% | 90% | 20% | 100% | 50% |
| Self-Driving Tech | 3 | 0% | 100% | 0% | 20% | 0% |
| Top Speed | 4 | 0% | 80% | 10% | 100% | 15% |
| Acceleration | 5 | 0% | 90% | 15% | 100% | 20% |
| User Reviews | 18 | 50% | 100% | 0% | 40% | 70% |
| Score | | 42.6 | 52.5 | 36.05 | 29.4 | 53.1 |

FIGURE 7

| Category | Predicate | Threshold | Weighting |
|---|---|---|---|
| 1 | mileage less than | 10,000 | -100% |
| 2 | mileage less than | 15,000 | 0% |
| 3 | mileage less than | 20,000 | 50% |
| 4 | mileage less than | 25,000 | 90% |
| 5 | mileage less than | 30,000 | 95% |
| 6 | mileage less than | 35,000 | 100% |
| 7 | mileage less than | 40,000 | 95% |
| 8 | mileage less than | 45,000 | 90% |
| 9 | mileage less than | 50,000 | 50% |
| 10 | mileage less than | 60,000 | 0% |
| 11 | mileage equal or above | 60,000 | -100% |

FIGURE 8

| Hard Factors | | Soft Factors | |
|---|---|---|---|
| DB Pension income significance for essential expenditure need in retirement | Considering all retirement income sources, how proportionately important is DB income in meeting your essential expenditure need | Investment Knowledge & Experience | Assessed through a short questionnaire about previous investments held, and general understanding/experience of investing (as per ATR assessment) |
| Attitude to Risk Score | 1 – 10 score as assessed through the ATR questionnaire | Retirement Needs Flexibility | Assessed against how deterministic, willingness and ability to return to paid work is needed |
| Critical Yield | An industry standard CB Transfer Analysis calculation, which represents the investment growth rate required to replace DB Pension Benefits with equivalent benefits (i.e. index linked annuity, with spouse's pension and guarantees) | How reliant is the spouse on income from this DB scheme? | Simple assessment by the adviser/client of the importance of this income to the spouse |
| Hurdle Rate | As Per Critical Yield, but is the growth rate required to buy an annuity without variables, spouses pension or guarantees | DB Knowledge & Understanding | During Triage, we assess how well the client understands their DB scheme and the benefits it provides, we take this assessment into the DB Transfer decision |
| Term to drawing pension benefits | Simply the number of years away from the date you intend to draw benefits from this pension | Requirement for Tax Free Cash | Does the client need to take a pension commencement lump sum, and if so for what purpose (paying debt has a higher adjusting than say, spending it on a holiday) |
| Pension income, 'Transfer Value Multiplier (factor) | To evaluate value for money of the transfer value offered, simply transfer value divided by annual income (20-25x income and above is good value) | Requirement for Inheritability | Clients preference towards leaving an inheritance |
| DB Pension Capital Significance | The DB Transfer value as a proportion of total retirement wealth | Need for Flexibility | How strong is the client's preference towards flexibility in pension income in retirement, currently this is tow down the list as we rather out any discretionary income need |
| Liquid Asset Cover | How many multiples of DB monthly income does the client hold in liquid assets (cash etc.) | Health | Is the client generally in good health, currently this is tow down the list as we rather out any instance where the client is not in good health |
| DB Pension income significance for discretionary income need in retirement | Considering all retirement income sources, how proportionately important is DB income in meeting your discretionary income need | | |

FIGURE 12

Factors

| number | name | weighting | factFindProperty |
|---|---|---|---|
| Just an ID (so numbers like ta are OK), any text. | A readable description of the factor, this is used in error reporting and in the suitability report and solution summary. Any text. | A number, the relative "importance" of this factor. A weighting of 0 means that this factor does not contribute to the decision; a negative weighting means that it opposes rather than supports the decision. | This should contain the name of the field that is used in the solution. You could leave this blank and let a developer fill it in, as long as there's a user story that unambiguously defines what field should be used. Otherwise it should match the name of a field in this fact-find-ui (whether the client facts or DB pensions or OS pensions analysis parts of the UI). |

| source | type |
|---|---|
| Where are we getting the value of the property from? See the notes below on what values this field can take. | This is used to work out how to format the field for reporting in the solution summary and suitability report. It can be 'number', 'percentage', 'interval' (for time intervals) or 'list value' in which cases we use the summary from the matched category to describe the result. |

Categories

| Factor Name | Predicate | Threshold | Weighting |
|---|---|---|---|
| The ID of the factor to which this category relates. Any text, but it should match the 'number' field in the factors table. | A symbol indicating the test that should be applied to the factor value, one of these exact symbols: <, <=, =, >=, >, !=, != | The number against which to test the factor value. This can be expressed as a number or as a percentage. | The multiple of the factor weighting which is applied to the contribution from this factor if this is the matching category. Can be a number or a percentage. |

| Summary | Is Referral | Referral Code |
|---|---|---|
| An interpretation of what it means to match this category. For example, it might mean that the factor is 'Low', 'Medium' or 'High'. Any text. | TRUE or FALSE, indicates whether a client who matches into this category should be referred out. | A reason to tell the advisor why the client is being referred, which will be shown in the solution summary. Any text. |

FIGURE 14

Example prioritisation

| Rank | Factor | Number of categories | Doesn't support transfer | | | Supports transfer |
|---|---|---|---|---|---|---|
| 1 | Capacity for loss | 3 | Limited | Moderate | | Considerable |
| 2 | Attitude to risk | 10 | 1 | 2,3,4,5,6,7,8,9 | | 10 |
| 3 | Investment experience | 3 | Limited | Moderate | | Considerable |
| 4 | Health | 4 | Excellent | Good | Average | Poor |
| 5 | Security of pension funds (PFAQ) | 3 | Response A | Response B | | Response C |
| 5 | Percentage of benefits (PFAQ) | 4 | Response A | Response B | Response C | Response D |
| | Lump sum death benefits (PFAQ) | 4 | Response A | Response B | Response C | Response D |
| | Spouse's and Dependants Children's Pensions (PFAQ) | 4 | Response A | Response B | Response C | Response D |
| | Cash sums at retirement (PFAQ) | 4 | Response A | Response B | Response C | Response D |
| | Retiring early (PFAQ) | 4 | Response A | Response B | Response C | Response D |
| | Risk and Reward (PFAQ) | 3 | Response A | Response B | | Response C |
| | We can quantify future income needs now | | Uncertain, e.g. several years before SRD | | | It's financially clear |
| | Has need for flexibility | | Unclear | | | Clear, obvious and sensible need |
| | Has little/no need for a secure, rising income from this plan | | Very reliant | | | No need |
| | DB fund relative to their overall wealth | | High % of overall assets | | | Low % of overall assets |
| | Death benefits are vital and cannot be secured through alternative methods (e.g. draw scheme and purchase WOL) | | 'Nice to have' | | | Vital, someone is relying on this capital |
| | Transfer value (using CFJs) | | Relatively poor | | | Relatively generous |

FIGURE 15

| Factor | Category 1 | Category 2 | Category 3 | Category 4 | Category 5 |
|---|---|---|---|---|---|
| Capacity for Loss | Limited | Moderate | Considerable | Not used | |
| | ~144 | 89 | 144 | | |
| Attitude to Risk | 1 | 2, 3, 4, 5, 6, 7, 8, 9 | 10 | | |
| | ~89 | 55 | 89 | | |
| Critical Yield | >2% | >3% | >4% | >5% | <5% |
| | 55 | 34 | 21 | 1 | ~55 |

FIGURE 16A

| Factor | Category 1 | Category 2 | Category 3 | Category 4 | Category 5 |
|---|---|---|---|---|---|
| Capacity for Loss | Limited | Moderate | Considerable | Not used | |
| 100 | ~100% | 50% | 100% | | |
| Attitude to Risk | 1 | 2, 3, 4, 5, 6, 7, 8, 9 | 10 | | |
| 80 | ~100% | 50% | 100% | | |
| Critical Yield | >2% | >3% | >4% | >5% | <5% |
| 70 | 100% | 80% | 60% | 40% | ~60% |

FIGURE 16B

| Reference | Name | Data Point |
|---|---|---|
| 1.a | Strong features /complex features? | DC_Pension_has_GARs |
| 1.b | Strong features /complex features? | DC_Pension_Is_Occupational_Scheme |
| 2. | Risk based funds aligned with customers risk assesment are available? | DC_Pension_Aligned_fund_available |
| 3. | Cost Comparison | DC_Pension_Scheme_TER |
| 4. | Does existing provider Asset Allocation offering align with own house view | DC_Pension_Does_Asset_Allocation_Match |
| 5. | Does scheme offer Drawdown | DC_Pension_Offers_Drawdown |
| 6. | Does scheme accomodate client investment preferences (e.g. ethical funds) | DC_Pension_Meets_Investment_Preferences |
| 7. | Does scheme accomodate clients desired investment approach | DC_Pension_Meets_Desired_Investment_Approach |
| 8. | How does past performance compare | DC_Pension_Past_Performance_Comparison |
| 9. | Adviser cost comparison | some form of cost comparison between what it would cost to review the pension funds available to you in the existing scheme vs. the advice fee of moving you |

FIGURE 17

| Scoring Table; the mechanism by which a transfer/don't transfer decision is arrived at | | |
|---|---|---|
| ID | Text | Reference |
| Target Score | Integer | The score which must be attained in order to reach a positive transfer determination, a % of the total Factor Weighting values in the table |
| Score Attained | Integer | The value set for this scoring table after the factors have been evaluated |
| Scoring Tolerance | Decimal | The +/- x% range within which the score attained is sufficiently close to the target score that it should be referred |

FIGURE 19

| Factor; a circumstance or fact which contributes to the assessment of suitability for the transfer | | |
|---|---|---|
| ID | Text | Reference |
| Factor Weighting | Integer | The value assigned by the house view of this factor (the higher the value, the greater the importance of this factor on the scoring outcome) |
| Fact Find Value | Integer | The value set for this factor through the fact find |
| Factor Value | Integer | The value set for this factor when the category score has been applied to the Fact Find value |
| Factor Summary | Integer | A score (1, 2 or 3) which is used in a simplified playback to the client (e.g. 1 represents "below average" capacity for loss, when the assessment may be more granular than this) |

FIGURE 20

Category; a rule against which the Fact Find Value can be tested in order to determined the Factor Value

| ID | Text | Reference |
|---|---|---|
| Is Referral | Boolean | If this category condition is met, the case should be referred to an adviser |
| Referral Code | Text | The unique, human referable, referral code which describes the reason for referral |
| Category Condition | Function | The logic which should be applied to the Fact Find Value to evaluate this category (e.g. less than 3 but more than 1) |
| Category Weighting | Decimal | The proportion of the factor weighting which should be applied to the factor value if this condition is met (i.e. if fact find value meets category condition, then set parent factor value to category weighting * factor weighting) |
| Category Summary | Integer | The value (1, 2 or 3) which should be applied to the parent factor summary if this category condition is true |

FIGURE 21

| Feature | Level 1 Threshold | Level 1 Weighting | Level 2 Threshold | Level 2 Weighting | Level 3 Threshold | Level 3 Weighting |
|---|---|---|---|---|---|---|
| ATR | <3 | 0 | >=3 and <7 | 5 | >=7 | 10 |
| DB Pension percentage of retirement savings | >=80% | 0 | <80% and >=50% | 5 | <50% | 10 |

FIGURE 23

|  | Test Case 1 | Test Case 2 |
|---|---|---|
| ATR | 8 (Threshold 3) | 6 (Threshold 2) |
| DB Pension percentage of retirement savings | 30% (Threshold 3) | 49% (Threshold 3) |
| Result | Transfer | Transfer |

FIGURE 24

|  | Live Case 1 | Live Case 2 | Live Case 3 | Live Case 4 |
|---|---|---|---|---|
| ATR | 10 (Threshold 3) | 9 (Threshold 3) | 6 (Threshold 2) | 5 (Threshold 2) |
| DB Pension percentage of retirement savings | 75% (Threshold 2) | 41% (Threshold 3) | 60% (Threshold 2) | 45% (Threshold 3) |
| Result | Transfer | Transfer | Do not Transfer | Transfer |

FIGURE 25

| | Test Case 2 | Test Case 2 normalised | Live Case 5 | Live Case 5 normalised |
|---|---|---|---|---|
| ATR | 6 (Threshold 2) | 0.6 | 6 (Threshold 2) | 0.6 |
| DB Pension percentage of retirement savings | 49% (Threshold 3) | 0.49 | 51% | 0.51 |

FIGURE 26

| Fact Find Field | Case Study 1 | Case Study 2 | Case Study 3 | Case Study 4 | Case Study n |
|---|---|---|---|---|---|
| Primary Residence Value | £250,000 | £500,000 | £1,000,000 | £150,000 | £0 |
| Outstanding Mortgage | £200,000 | £150,000 | £450,000 | £0 | £0 |
| Buy to Let Value | £0 | £450,000 | £150,000 | £0 | £0 |
| Buy to Let mortgages | £0 | £300,000 | £0 | £0 | £0 |
| Cash | £45,000 | £50,000 | £10,000 | £100,000 | £5,000 |
| Investments Value | £150,000 | £50,000 | £5,000 | £250,000 | £45,000 |
| DC Pension Value | £300,000 | £200,000 | £40,000 | £50,000 | £30,000 |
| DB Transfer Value | £0 | £0 | £50,000 | £250,000 | £0 |
| Wine / Fine Art etc. | £0 | £0 | £20,000 | £5,000 | £0 |
| Liquid Wealth | £45,000 | £50,000 | £10,000 | £150,000 | £5,000 |
| Retirement Wealth | £495,000 | £400,000 | £410,000 | £150,000 | £30,000 |

FIGURE 27

| Fact Find Field | Learning |
|---|---|
| Primary Residence Value | 0% |
| Outstanding Mortgage | 0% |
| Buy to Let Value | 0% |
| Buy to Let mortgages | 0% |
| Cash | 100% |
| Investments Value | 0% of any value below £200,000 and 100% of the excess |
| DC Pension Value | 0% |
| DB Transfer Value | 0% |
| Wine / Fine Art etc. | 0% |

FIGURE 28

| Fact Find Field | Learning |
|---|---|
| Primary Residence Value | 0% |
| Outstanding Mortgage | 0% |
| Buy to Let Value | 100% |
| Buy to Let mortgages | 100% (assuming this is included as -£ so this will give us BTL net value) |
| Cash | 0% of any value below £50,000 and 100% of the excess |
| Investments Value | of any value below £200,000 and 100% of the excess |
| DC Pension Value | 100% |
| DB Transfer Value | 0% |
| Wine / Fine Art etc. | 0% |

FIGURE 29

GENERALIZING AND CATEGORIZING DATA. PART TWO.

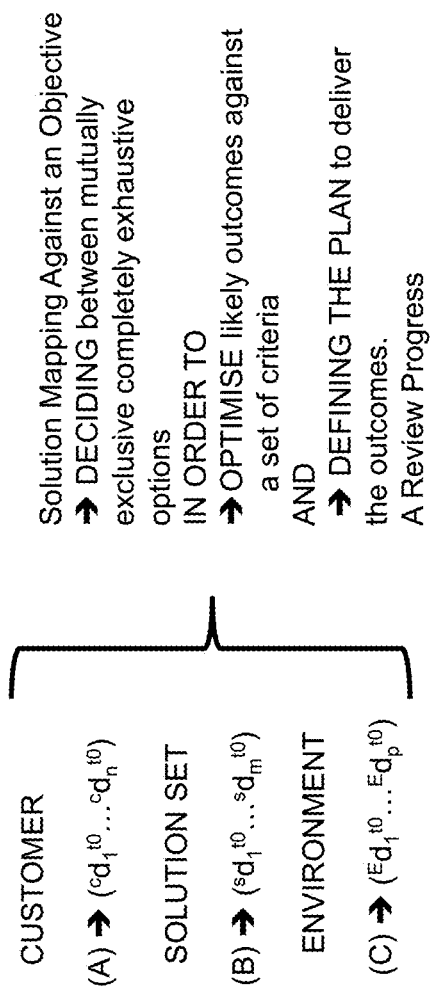

$t_0$: Point of initial advice
Data is dynamic over time.

CUSTOMER
(A) ➔ $(^cd_1{}^{t0} \ldots {}^cd_n{}^{t0})$

SOLUTION SET
(B) ➔ $(^sd_1{}^{t0} \ldots {}^sd_m{}^{t0})$

ENVIRONMENT
(C) ➔ $(^Ed_1{}^{t0} \ldots {}^Ed_p{}^{t0})$

Solution Mapping Against an Objective
➔ DECIDING between mutually exclusive completely exhaustive options
IN ORDER TO
➔ OPTIMISE likely outcomes against a set of criteria
AND
➔ DEFINING THE PLAN to deliver the outcomes.
A Review Progress In the multi attribute utility theory, factors are functions of the data, e.g.

| OUTCOME PREFERENCE | FACTOR | |
|---|---|---|
| Likely to have higher income in Retirement, if transfer | Critical Yield ➔ $f(d\ldots d)$ | |
| Likely to have when I need, if transfer | Capacity for Loss ➔ $f(d\ldots d)$ | |

FIGURE 31

Highest Weighting: (Advice influencers)

| | Factor | Low | Medium | High |
|---|---|---|---|---|
| Capacity for Loss | The client can bare a loss of x% in on-going income through retirement | >10% | >20% | <20% |
| | What level of flexibility does the client have in their expenditure/income need | Limited | Moderate | Considerable |
| ATR | Questionnaire outcome | >5 | 5+ | |
| | Investment Knowledge & Experience | Limited | Moderate | Considerable |
| Health | State of health | Generally Good health (for age) | Expecting a shorter than average life expectancy | seriously ill |

Mid Weighting: (Can sway the decision)

| | Factor | Low | Medium | High |
|---|---|---|---|---|
| Is the transfer good value for money? | Factor of current revalued pension to SRD | <20x | 30>M>20 | 30+ |
| | Critical Yield | 7%+ | 5-7% | <5% |
| | Hurdle Rate | 8%pa | 5% | 2% |
| | Spouse/dependants (giving up spouse pension??) | High (heavy Reliance) | Partial (some reliance) | None (no reliance on spouse/dependents benefit) |
| | Beneficiaries (preference for inheritability) | None | Nice to have | Very important |
| | DB value as a % of total retirement provision | high | medium | low |
| | Liquid assets to cover DB income amount as drawdown | 6months or less | >6months to 2years | >2years |

Lower Rating: (mainly contributory factors)

| | Factor | Low | Medium | High |
|---|---|---|---|---|
| | Amount of Tax Free Cash | low | Med | High |
| | Need for Flexibility of Benefits | low | med | high |
| | DB income vs required income | equal or less | greater | much greater |
| | Access to tax free cash / Pension Unlocking | low | med | high |

FIGURE 33

| Test Case | Outcome | Status | Notes |
|---|---|---|---|
| 1* | Transfer | Marginal Pass | Data/Information regarding retirement priorities and motivations to transfer led to a less than clear transfer determination |
| 2* | Transfer | Pass | |
| 3 | Transfer | Pass | |
| 4 | Transfer | Pass | |
| 5 | Transfer | Marginal Pass | |
| 6 | Transfer | Pass | |
| 7 | Transfer | Pass | Client in ill health |
| 8* | Transfer | Marginal Pass | |
| 9*^ | Don't Transfer | Marginal Pass | Insistent client |
| 10 | Don't Transfer | Marginal Fail | A review of this case suggests the decision was marginal, and a decision was reached only after deliberation by the client and adviser, largely due to a lack of strong reason to transfer |
| 11* | Transfer | Pass | |
| 12* | Transfer | Marginal Pass | Consideration against PPF (likely to exceed threshold), potential for future illness and LTA considerations |
| 13* | Transfer | Marginal Pass | Source of income and capacity for loss (capital vs. income assessment) could be considered here further |
| 14 | Transfer | Marginal Pass | Considerable other, non-pension assets held across the household – consider how total wealth is assessed in the model. Income across the household is also an important consideration as need could be met by spouse |

| Test Case | Previous Outcome | Model Outcome | Client Outcome | Notes |
|---|---|---|---|---|
| 1* | Transfer | Transfer (referral) | Pass | Referred as the case for transfer was not strongly inferred by the algorithm. While the outcome was correct, this case provides an opportunity to further calibrate the advice engine. Case Notes: Data/information regarding retirement priorities and motivations to transfer led to a less than clear transfer determination |
| 2* | Transfer | Transfer | Pass | |
| 3 | Transfer | Transfer | Pass | |
| 4 | Transfer | Transfer | Pass | |
| 5 | Transfer | Transfer (referral) | Pass | Referred as the case for transfer was not strongly inferred by the algorithm. While the outcome was correct, this case provides an opportunity to further calibrate the advice engine. |
| 6 | Transfer | Transfer | Pass | |
| 7 | Transfer | Transfer | Pass | Client in ill health. |
| 8* | Transfer | Transfer | Pass | |
| 9*^ | Don't Transfer (marginal) | Don't Transfer (referral) | Pass | Referred as the case to transfer was not strong, however in this case this is well aligned with the original advice and it therefor a positive referral which is desirable in live. Case notes: Insistent client |
| 10 | Don't Transfer (marginal) | Transfer (referral) | Pass | While this case was referred to an advisor due to the case being unclear, and therefore the outcome was correct, the algorithm indicated a slight and incorrect preference toward transfer. Therefore this case provides an opportunity to further calibrate the advice engine. Case notes: A review of this case suggests the decision was marginal, and a decision was reached only after deliberation by the client and advisor, largely due to a lack of strong reasons to transfer |
| 11* | Transfer | Transfer | Pass | |
| 12* | Transfer | Transfer (referral) | Pass | Referred to advisor due to LTA considerations, which is a positive referral and desirable in live. Case notes: Consideration against PPF (likely to exceed threshold), potential for future illness and LTA considerations. |
| 13* | Transfer | Transfer (referral) | Pass | Referred as the case for transfer was not strongly inferred by the algorithm. While the outcome was correct, this case provides an opportunity to further calibrate the advice engine. Case notes: Source of income and capacity for loss (capital vs. income assessment) could be considered here further |
| 14 | Transfer | Transfer (referral) | Pass | Referred as the case for transfer was not strongly inferred by the algorithm. While the outcome was correct, this case provides an opportunity to further calibrate the advice engine. Case notes: Considerable other, non-pension assets held across the household – consider how total wealth is assessed in the model, income across the household is also an important consideration as need could be met by spouse |

| Data Point | Notes | EXAMPLE Client 14 |
|---|---|---|
| Fact Find | PW score | 100% |
| | Calculated Score | 56% |
| | Calculated Score Variance | 43.72 |
| | Previous model score | 47% |
| Income from DB scheme at SRD (pre commutation) | | 3069 |
| Critical Yield | | 0.122 |
| DB Transfer Value | | 93014 |
| Hurdle Rate | | 0.048 |
| Age | | 62 |
| Attitude to risk score | | 6 |
| State of health | 1 = seriously ill / confirmed as terminally ill by medical professional<br>2 = Expecting a shorter than average life expectancy<br>3 = Generally Good health (for age) | 3 |
| Total Retirement Provision | | 18000 |
| Liquid Assets | | 1050000 |
| Soft Facts | | |
| Essential income requirement | | 13000 |
| Target Income Requirement | | 39000 |
| Likely income from other sources | | |
| What level of flexibility does the client have in their expenditure/income need? | 1 = Limited: I'm not able to adjust my budget and reduce my spending for any period of time<br>2 = Moderate: I can reduce my income down to the mandatory level but only for a short period of time<br>3 = Considerable: I can reduce my income down to mandatory for a lengthy period of time | 2 |
| Are you willing and able to restart paid work again? | 1 = No<br>2 = I'd really prefer not to<br>3 = Yes it wouldn't be a problem | 1 |
| Planned retirement age | | 62 |
| Investment Knowledge & Experience | 1 = Limited<br>2 = Moderate<br>3 = Considerable | 2 |
| DB Triage Questions - how many did they get right? | | 4 |
| Client question: How reliant is your partner on this pension for their security in retirement: | 1 = heavy<br>2 = partial<br>3 = negligible | 2 |

FIGURE 42

| Requirement for inheritability? | 1 = None | |
| | 2 = Nice to have | |
| | 3 = very important | 2 |
| Need for Lump Sum at retirement | 1 = I'll take it but I'm not concerend about the relative size of the lump sum | |
| | 2 = I have a specifc plan for the cash and I need the highest lump sum I can get | 2 |
| Need for Flexibility of Benefits? | 1 = Limited | |
| | 2 = Moderate | |
| | 3 = Considerable | 3 |
| Analysed Fact Find | | |
| requirement income capacity for loss | | 0.236076923 |
| Term to drawing benefits? | | 0 |
| Factor of current revalued pension? | | 30.30759205 |
| DB value as a % of total retirement provsion? | | 84% |
| Liquid assets to cover DB income amount as drawdown? | | 684.2619746 |
| % of 'required' income (i.e. declared target income less income from other sources) is met by DB income? | | 1271% |

| | Outcome | TRUE |
|---|---|---|
| Overall Score | Unlear Result alert | 0.562829167 |
| | confidence | 150% |
| 1. % of income need in retirement derived from DB Scheme | Score | Low |
| | Summary | none |
| | Referral | 3 |
| 2.a Ability to flex short term income needs | Score | Moderate |
| | Summary | none |
| | Referral | 0.75 |
| 2.b willingness to restart paid work | Score | None |
| | Summary | none |
| | Referral | 5 |
| 3. Term to drawing benefits? | Score | Imminent |
| | Summary | N/A |
| | Referral | 4.9998 |
| 4. Attitude to Risk? | Score | Moderate |
| | Summary | N/A |
| | Referral | 8.19 |
| 5.a Investment Knowledge & Experience? | Score | Moderate |
| | Summary | none |
| | Referral | 4 |

FIGURE 43

| | | | |
|---|---|---|---|
| 5.b DB knowledge and understanding | | Score | Considerable |
| | | Summary | none |
| | | Referral | 0 |
| 6. State of health? | | Score | Generally Good health (for age) |
| | | Summary | N/A |
| | | Referral | 4 |
| 7. Factor of current revalued pension? | | Score | Above Average |
| | | Summary | none |
| | | Referral | 0.6 |
| 8. CY? | | Score | Poor |
| | | Summary | none |
| | | Referral | 6 |
| 9. Hurdle rate? | | Score | Good |
| | | Summary | none |
| | | Referral | 1.9998 |
| 10. How reliant is spouse on pension? | | Score | Partial |
| | | Summary | none |
| | | Referral | 1.5 |
| 11. Requirement for inheritability? | | Score | Nice to Have |
| | | Summary | none |
| | | Referral | 0.9999 |
| 12. DB value as a % of total retirement provision? | | Score | Significant |
| | | Summary | none |
| | | Referral | 20 |
| 13. Liquid assets to cover DB income amount as drawdown? | | Score | Considerable coverage |
| | | Summary | none |
| | | Referral | 3 |
| 14. Need to maximise the amount of Tax Free Cash? | | Score | specific need |
| | | Summary | none |
| | | Referral | 2 |
| 15. Need for Flexibility of Benefits? | | Score | High |
| | | Summary | none |
| | | Referral | 0 |
| 16. % of 'required' income (i.e. declared target income less income from other sources) is | | Score | Significant |
| | | Summary | none |
| | | Referral | none |

FIGURE 44

50% Threshold: 10%

| Group | Group Weighting Target | Factor Reference | Question | How we get the answer | Notes | Factor Weighting |
|---|---|---|---|---|---|---|
| | | 1 | What % income can they afford to lose from the ongoing income generated from this pension, before required expenditure need is no longer met? | % income from DB scheme at SRD (pre commutation) divided by their essential income requirement. | This is long term impact throughout retirement | 15 |
| | | 2a | What level of flexibility does the client have in their expenditure/income need? (1) | Client choice: 1. I'm not able to adjust my budget and reduce my spending for any period of time = limited. 3: 'I can reduce my income down to the mandatory level but only for a short period of time' = moderate. 3: 'I can reduce my income down to mandatory for a lengthy period of time' = considerable | This is a shorter term ability to flex income needs | 7.5 |
| | | 2b | | Are you willing and able to restart paid work again? 1 - No. 2 - I'd really prefer not to. 3 - Yes it wouldn't be a problem | | 7.5 |
| | | 3 | Term to drawing benefits? | straight from FF | | 5 |
| | | 4 | Attitude to Risk? | straight from FF | | 13 |
| | Target: 60% Actual: 54.17% | | | | | |

FIGURE 45

| | | | |
|---|---|---|---|
| 5a | Investment knowledge & Experience? | Use existing PW K&E to gain score and thus category | knowledge is probably more key here, specifically relating to understanding the issues in DB world - hence the triage quiz | 13 |
| 5b. | DB knowledge and understanding | Use the 4 triage questions: 0/1 correctly answered = limited, 2 correct=moderate, 3/4 correct=considerable | | 4 |
| 6 | State of health? | Themis uses full health questionnaire at outset which is not appropriate for Saturn. So for POC use self declaration with 1 question and the 3 options as a drop down. And 'refer' unless answer is 'good for age'. Need to consider what longer term solution is | Remove from scoping and then create a referral unless generally good'. POC doesn't cover the need to look at annuity purchase. We could do a sub routine to analyse merits of transferring out to buy annuity where health is an issue? | 0 |
| 7 | Factor of current revalued pension? | TV / Pension Income | | 4 |
| 8 | CY? | Straight from FF | | 6 |
| 9 | Hurdle rate? | Straight from FF | | 6 |
| 10 | How reliant is spouse on pension? | Client question: How reliant is your partner on this pension for their security in retirement; 'heavy/partial/negligible | | 0 |
| 11 | Requirement for inheritability? | Use death benefit factfind questions answer 1=none, 2=nice to have and 4 is very important | For MVP we are also looking at the analysis of income/assets for partner after 1st death to quantify/ratify this situation | 3 |
| 12 | DB value as a % of total retirement provision? | Add field to FF (total retirement provision). DB TV / Total Retirement Provision | We can also adapt FF to work this out for us as long as client identifies which assets they want to use | 3 |

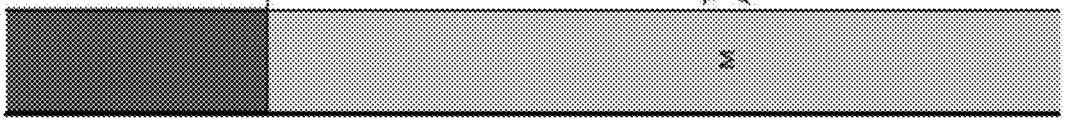

Target: 50%
Actual: 39.17%

FIGURE 46

| # | | | | |
|---|---|---|---|---|
| 13 | Liquid assets to cover DB income amount as drawdown? | Add field to FF (liquid assets retirement provision). Then Liquid Assets / 6months worth of DB income (in year 1) | Need to add cash they are going to received form DB and take off cash spending plans | 20 |
| 14 | Need to maximise the amount of Tax Free Cash? | Customer choice? ?. I'll take it but I'm not concerned about the relative size of the lump sum = low. I have a specific plan for the cash and I need the highest lump sum I can get = high | | 3 |
| 15 | Need for Flexibility of Benefits? | Use Themis preference questions. | This is anticipation of flexibility whereas the questions in 'high' above are your tolerance for flexibility. So as it's currently of very modest importance from a scoring perspective then use Themis existing structure to get max score | 2 |
| 16 | % of 'required' income (i.e. declared target income less income from other sources) is met by DB income? | calculation from fact find. | | 3 |
| | | | Total | 120 |

Target: 10%
Actual: 6.67%

FIGURE 47

| | | | | | | | |
|---|---|---|---|---|---|---|---|
| 5a | 1 | 1 | 0.00% | Limited | FALSE | N/A | |
| 5b | < | 2 | 25.00% | Limited | FALSE | N/A | |
| 6 | 1 | 1 | 0.00% | seriously ill / confirmed as terminally ill by medical professional | TRUE | PKG03: Client in ill health | |
| 7 | < | 20 | 25% | Poor Value | FALSE | N/A | |
| 8 | < | 5% | 100% | Good | FALSE | N/A | |
| 9 | < | 5% | 100% | Good | FALSE | N/A | |
| 10 | 1 | 1 | 16.67% | Heavy | FALSE | N/A | |
| 11 | 1 | 1 | 50% | None | FALSE | N/A | |
| 12 | < | 10% | 100% | Marginal | FALSE | N/A | |

Target: 35%
Actual: 39.17%

FIGURE 49

| | | | | | | |
|---|---|---|---|---|---|---|
| 13 | < | 1 | 0.00% | Low coverage | FALSE | N/A |
| 14 | = | 1 | 5% | No specific Need | FALSE | N/A |
| 15 | = | 1 | 25% | Low | FALSE | N/A |
| 16 | < | 5% | 100% | Marginal | FALSE | N/A |

Target: 10%
Actual: 6.67%

FIGURE 50

METHOD, SYSTEM AND COMPUTER PROGRAM PRODUCT FOR PROVIDING AUTOMATED ADVICE

CROSS REFERENCE TO RELATED APPLICATIONS

This application claims the priority of PCT/GB2019/050605, filed on Mar. 5, 2019, which claims priority to Great Britain Application Nos. GB 1803677.2, filed on Mar. 7, 2018; and GB 1803730.9, filed on Mar. 8, 2018, the entire contents of each of which are incorporated fully herein by reference.

BACKGROUND OF THE INVENTION

1. Field of the Invention

The field of the invention relates to methods, systems, processors and computer program products for providing automated advice. The automated advice may be financial advice.

2. Technical Background

Financial advice software is known. But the software tends to be limited to pre-programmed cases, in which a limited number of advice scenarios are envisaged, in which the scenario that is selected for use (e.g. resulting in the advice "An Individual Savings Account (ISA) investment would be suitable for you", or "We recommend that you wait until your cash flow is healthier") is selected based on parameters that are pre-selected by the programmer at the time of programming the advice software, and which risks not matching so well, or at all, the advice that an expert, human advisor would give in the same circumstances.

3. Discussion of Related Art

EP1139257 (A1) discloses an electronic system which provides financial advice based on personal data and financial objectives entered by users, by means of a rules engine. The rules engine detects whether the financial objectives match the personal data provided by the user and issues a challenge, or initiates a communication with a financial adviser, if they do not. The system stores general financial information and automatically provides updated financial advice to the user when the general financial information changes. The financial advice is in the form of a document compiled from text passages selected by matching pre-defined values to the user's personal data. The data and rules used to generate the financial advice are stored so as to be available for inspection, to demonstrate compliance with financial regulations.

The "rules engine" approach of EP1139257 (A1) is exemplified by paras. [055] to [056] therein, which include "If the customer is:
Aged between 18 and 75; and
Not unemployed; and
Not terminally ill; and
Wishes to invest within Inland Revenue limits; and
Has a risk tolerance sufficient for the stock market; and
Has an investment horizon of 4 years or more; and
Has no existing ISA investment; and
Is a UK resident for tax purpose; and
Can afford the investment Then state that "An ISA investment would be suitable for you"."

The "rules engine" approach provides a rules engine, written by humans, which attempts to provide access to expert advice. But such a "rules engine" only covers specific cases that have been pre-programmed, and does not capture the expertise that an expert could bring when advising over a large, broad set of advice scenarios. What is needed is a technical solution which is a computer-based system which provides advice, taking advantage of the expertise that an expert brings when advising over a large, broad set of advice scenarios.

SUMMARY OF THE INVENTION

According to a first aspect of the invention, there is provided a computer implemented method of providing automated advice, such as financial advice, the method including the steps of:
(i) receiving a plurality of factors (e.g. capacity for loss, state of health) for use in providing automated advice, each factor including a defined respective set of categories, and each factor and each category including a respective initial weighting;
(ii) receiving a rule for generating a recommendation using the plurality of factors, and the categories, and using the respective weightings of the plurality of factors and the categories, the rule including a set of possible recommendations (e.g. transfer pension plan, don't transfer pension plan), such that a generated recommendation is one of the set of possible recommendations;
(iii) receiving a plurality of training cases, each training case including inputs relating to each factor of the plurality of factors, and to the categories, and each training case including a respective validated recommendation which is one of the set of possible recommendations;
(iv) processing the plurality of training cases, to derive a respective optimized weighting for each factor of the plurality of factors, and for each category, to satisfy or to match the respective validated recommendations optimally, using the rule, and
(v) storing the derived respective optimized weightings for the plurality of factors and for each category.

The plurality of factors, the categories, and their respective initial weightings, may be stored in a non-transitory storage medium. The rule for generating a recommendation may be stored in a non-transitory storage medium. The plurality of training cases may be stored in a non-transitory storage medium.

Where we refer to satisfying or matching the respective validated recommendations optimally, we are acknowledging that in some instances, not all the training cases will be matched exactly when the rule is used together with the optimized weightings. The skilled person with knowledge of modeling will understand that a model does not always fit all the available data exactly, but nevertheless it is possible to adjust a model so that it provides a best fit of the available data, without necessarily exactly fitting all the data. An advantage of using initial weightings is that suitable initial weightings may reduce the chance that the set of derived weightings is a sub-optimal set of derived weightings.

The invention provides a technical solution to the technical problem of providing a computer implemented method of providing automated advice, in which the automated advice incorporates, or is trained by, the advice of human experts, without those human experts having to provide their decision methodology explicitly, in detail. An advantage of the method is that advice of a similar utility to that of human experts can be generated by the computer implemented method. An advantage is that the automated advice can be used to check if an individual advisor is providing advice which is consistent with the automated advice. An advantage is that the automated advice can show whether an individual adviser's case is an "outlier" relative to a bank of training cases—or is covered in a different usage. An advantage is that the automated advice can be used to check if previously issued advice is consistent with the automated advice. An advantage is that the automated advice may be more consistent and reliable than advice provided by human advisors. An advantage is that advice may be provided at lower cost than advice provided by human advisors. A computer carrying out the method operates in a new way.

The method may further include the steps of:
(vi) retrieving the stored derived respective optimized weightings for the plurality of factors, and for each category;
(vii) receiving from a user terminal inputs relating to each factor of the plurality of factors, and to the categories;
(viii) processing the retrieved derived respective optimized weightings for the plurality of factors, and for each category, together with the received inputs relating to each factor of the plurality of factors, and to the categories, using the rule, to generate a recommendation, and
(ix) transmitting the recommendation to the user terminal, to provide automated advice.

The method may further include the steps of:
(vi) retrieving the stored derived respective optimized weightings for the plurality of factors, and for each category;
(vii) receiving from a user terminal inputs relating to each factor of the plurality of factors, and to the categories;
(viii) processing the retrieved derived respective optimized weightings for the plurality of factors, and for each category, together with the received inputs relating to each factor of the plurality of factors, and to the categories, using the rule, the rule including scoring, to generate a score and a recommendation relating to the score, and
(ix) if the score is within a predefined range, transmitting the score and the recommendation to an adviser for further consideration, and if the score is outside the predefined range, transmitting the recommendation to the user terminal, to provide automated advice.

An advantage is that the automated advice is provided directly to a user, only when it has been determined that the advice is reliable enough to be given without human scrutiny.

The method may further include the step of the user terminal receiving the user input, and the user terminal transmitting the received user input for reception in step (vii).

The method may be one in which the user terminal is a smartphone, a tablet computer, a mobile device, a laptop computer, a desktop computer, or a smart TV, or a voice control interface device (e.g. Amazon Echo). Communication with the user terminal may be wireless (e.g. cellular, WiFi, Bluetooth) or by a wired connection.

The method may be one in which at least some categories include a category threshold, in which the rule uses the category thresholds, in which the category thresholds are optimized in step (iv), and in which the optimized category thresholds are stored in step (v).

The method may be one in which at least some categories include a category threshold, in which the rule uses the category thresholds, in which the category thresholds are optimized in step (iv), in which the optimized category thresholds are stored in step (v), in which stored category thresholds are retrieved in step (vi), and in which the retrieved stored category thresholds are used in the rule, in the processing of step (viii).

The method may be one in which each factor and each category includes an explanatory text field, which explains why the respective factor or category is important, if it has been highly scored.

The method may be one in which each factor and each category includes an explanatory text field, which explains why the respective factor or category is important, if it has been highly scored, and in which a report is assembled in which the explanatory text fields associated with the most highly scored factors or categories are included, to provide an explanation of why the recommendation has been generated, together with the recommendation.

An advantage is that a report may be assembled automatically to be provided with a recommendation, in which the report explains why the recommendation has been generated.

The method may be one in which the outputs and/or workings of calculations or analysis which were completed in the process of generating advice, is provided, for example in a spreadsheet.

The method may be one in which a suitability report is provided which contains detail of the advice given, the reasons for it, and any risks or considerations the client should be aware of in relation to the recommendation and details of the recommendation.

The method may be one in which retrieved data is included in one or more CSV files.

The method may be one in which Category scores are a multiple of their Factor score, and the rule Score is some multiple of the total Factor Scores.

The method may be one in which financial advice is provided.

The method may be one in which the financial advice provided is income protection advice, or drawdown advice, or pension transfer advice.

The method may be one in which the method uses asset sub-totals.

The method may be one in which the method uses one or more of growth rate, inflation rates, or charging rate, in investment growth projections.

The method may be one including the step of using financial data (e.g. present and future interest rates, present and future inflation rates) in step (viii).

The method may be one in which anomaly detection is performed based on thresholds.

The method may be one in which the anomaly detection is performed by identifying which threshold a case lies in for each category and seeing if there is a test case that shares the same thresholds that can be used to check the recommendation. An advantage is that more reliable advice may be provided.

The method may be one in which anomaly detection is based on proximity, in which the categories are normalised and then the proximity of a live case to a test case is measured and then if the difference is too high the case is referred to an adviser for further processing. An advantage is that less reliable advice is referred to an adviser.

The method may be one in which if there is a test case that shares the same thresholds then a recommendation is issued to a user, otherwise the recommendation is calculated and the case is referred to an adviser for further processing. An advantage is that more reliable advice may be provided, and that less reliable advice is referred to an adviser.

The method may be one in which the method enables anomalies and outliers to be identified and highlighted for further investigation.

The method may be one in which it is possible to run a complete check on past cases of advice given to identify if there are any anomalies.

The method may be one in which the method includes using examples of good decisions, and the factors which were considered when making them; Artificial Intelligence then completes the work of understanding the basis on which decisions were made.

The method may be one in which a human expert making recommendations is not required to describe their recommendation-making process, to provide the automated advice. An advantage is that mistakes made when a human expert tries to describe their recommendation-making process are not incorporated into the method.

The method may be one in which past examples are taken of decisions which have been made (and which are known to be right or have been checked as being right) and they are used to understand what makes, or made, a good decision.

The method may be one in which constraints are imposed on the advice software by providing the items in the fact find which an adviser would deem appropriate to consider in their decision.

The method may be one in which the advice software is calibrated/trained using past cases.

The method may be one in which it is possible to compare a particular adviser within a firm to the firm's house view. An advantage is that less reliable advisors may be identified, and that highly reliable advisors may be identified.

The method may be one in which a weighted cosine similarity is used to select test cases, to map out an advice space. An advantage is that an improved set of test cases is provided.

The method may be one in which the advice is provided using one or more of voice, chat, emotive robots or computer vision.

The method may be one in which the advice is provided in other advisory industries (e.g.: medical or legal).

According to a second aspect of the invention, there is provided a processor, the processor configured to:
(i) receive a plurality of factors (e.g. capacity for loss, state of health) for use in providing automated advice (e.g. financial advice), each factor including a defined respective set of categories, and each factor and each category including a respective initial weighting;
(ii) receive a rule for generating a recommendation using the plurality of factors, and the categories, and using the respective weightings of the plurality of factors and the categories, the rule including a set of possible recommendations (e.g. transfer pension plan, don't transfer pension plan), such that a generated recommendation is one of the set of possible recommendations;
(iii) receive a plurality of training cases, each training case including inputs relating to each factor of the plurality of factors, and to the categories, and each training case including a respective validated recommendation which is one of the set of possible recommendations;
(iv) process the plurality of training cases, to derive a respective optimized weighting for each factor of the plurality of factors, and for each category, to satisfy or to match the respective validated recommendations optimally, using the rule, and
(v) store the derived respective optimized weightings for the plurality of factors and for each category.

The processor may be further configured to:
(vi) retrieve the stored derived respective optimized weightings for the plurality of factors, and for each category;
(vii) receive from a user terminal inputs relating to each factor of the plurality of factors, and to the categories;
(viii) process the retrieved derived respective optimized weightings for the plurality of factors, and for each category, together with the received inputs relating to each factor of the plurality of factors, and to the categories, using the rule, to generate a recommendation, and
(ix) transmit the recommendation to the user terminal, to provide automated advice.

According to a third aspect of the invention, there is provided a system including the processor of the second aspect of the invention, and the user terminal referred to in the second aspect of the invention, the user terminal arranged to provide the automated advice to a user.

The system may be one arranged to perform the method of any aspect of the first aspect of the invention.

According to a fourth aspect of the invention, there is provided a computer program product executable on a processor to:
(i) receive a plurality of factors (e.g. capacity for loss, state of health) for use in providing automated advice (e.g. financial advice), each factor including a defined respective set of categories, and each factor and each category including a respective initial weighting;
(ii) receive a rule for generating a recommendation using the plurality of factors, and the categories, and using the respective weightings of the plurality of factors and the categories, the rule including a set of possible recommendations (e.g. transfer pension plan, don't transfer pension plan), such that a generated recommendation is one of the set of possible recommendations;
(iii) receive a plurality of training cases, each training case including inputs relating to each factor of the plurality of factors, and to the categories, and each training case including a respective validated recommendation which is one of the set of possible recommendations;
(iv) process the plurality of training cases, to derive a respective optimized weighting for each factor of the plurality of factors, and for each category, to satisfy or to match the respective validated recommendations optimally, using the rule, and
(v) store the derived respective optimized weightings for the plurality of factors and for each category.

The computer program product may be executable to perform a method of any aspect of the first aspect of the invention.

According to a fifth aspect of the invention, there is provided a computer-implemented method of improving the computer-implemented method of providing automated advice of any aspect of the first aspect of the invention, in which the method of improving includes the steps of
(a) in a new case, comparing a recommendation generated by the computer-implemented method of providing automated advice with a corresponding recommendation received from an advisor for the new case, and if the recommendations differ, in step (iv), processing the plurality of training cases, together with the new case including the recommendation received from the advisor, to derive a respective optimized weighting for each factor of the plurality of factors, and for each category, to satisfy or to match the respective validated recommendations optimally, using the rule and
(b) store the derived respective optimized weightings for the plurality of factors and for each category.

According to a sixth aspect of the invention, there is provided a processor configured to perform the computer-implemented method of the fifth aspect of the invention.

According to a seventh aspect of the invention, there is provided a computer program product, executable on a processor to improve the computer-implemented method of providing automated advice of any aspect of the first aspect of the invention, in which the computer program product is executable to:

(a) in a new case, compare a recommendation generated by the computer-implemented method of providing automated advice with a corresponding recommendation received from an advisor for the new case, and if the recommendations differ, in step (iv), to process the plurality of training cases, together with the new case including the recommendation received from the advisor, to derive a respective optimized weighting for each factor of the plurality of factors, and for each category, to satisfy or to match the respective validated recommendations optimally, using the rule and
(b) store the derived respective optimized weightings for the plurality of factors and for each category.

According to an eighth aspect of the invention, there is provided a computer implemented method of providing automated advice, such as financial advice, in which weightings of a plurality of factors (e.g. capacity for loss, state of health) for use in providing automated advice, each factor optionally including a defined respective set of categories, and optionally including weightings of the categories, are trained using a plurality of validated training cases, to provide a trained plurality of weightings for the factors, and optionally, trained weightings for the categories, for providing automated advice.

The method may be one further including a method of any aspect of the first aspect of the invention.

According to a ninth aspect of the invention, there is provided a processor configured to perform the computer-implemented method of any aspect of the eighth aspect of the invention.

According to a tenth aspect of the invention, there is provided a computer implemented method of providing automated advice, such as financial advice, in which an advice model is trained using a plurality of validated training cases, to provide a trained model for providing automated advice.

The method may be one further including a method of any aspect of the first aspect of the invention.

According to an eleventh aspect of the invention, there is provided a processor configured to perform the computer-implemented method of any aspect of the tenth aspect of the invention.

According to a twelfth aspect of the invention, there is provided a computer implemented method of providing automated advice, such as financial advice, the method including the steps of:
(i) receiving a plurality of factors (e.g. capacity for loss, state of health) for use in providing automated advice, each factor including a defined respective set of possible inputs, and each factor including a respective initial weighting;
(ii) receiving a rule for generating a recommendation using the plurality of factors, and a set of possible recommendations (e.g. transfer pension plan, don't transfer pension plan), such that a generated recommendation is one of the set of possible recommendations;
(iii) receiving a plurality of training cases, each training case including a respective input for each factor of the plurality of factors, and each training case including a respective validated recommendation which is one of the set of possible recommendations;
(iv) processing the plurality of training cases, to derive a respective optimized weighting for each factor of the plurality of factors, to satisfy or to match the respective validated recommendations optimally, using the rule, and
(v) storing the derived respective optimized weightings for the plurality of factors.

The method may be one further including the steps of:
(vi) retrieving the stored derived respective optimized weightings for the plurality of factors;
(vii) receiving from a user terminal inputs relating to the defined respective set of possible inputs for each factor of the plurality of factors;
(viii) processing the retrieved derived respective optimized weightings for the plurality of factors, together with the received inputs relating to the defined respective set of possible inputs for each factor of the plurality of factors, using the rule, to generate a recommendation, and
(ix) transmitting the recommendation to the user terminal, to provide automated advice.

The method may be one further including a method of any aspect of the first aspect of the invention.

According to a thirteenth aspect of the invention, there is provided a processor configured to perform the computer-implemented method of any aspect of the twelfth aspect of the invention.

BRIEF DESCRIPTION OF THE FIGURES

Aspects of the invention will now be described, by way of example(s), with reference to the following Figures, in which:

FIG. 2A shows a table of input data for a one attribute model. FIG. 2B shows a table of input data for a two attributes model.

FIG. 3A shows a calculation for a decision outcome. FIG. 3B shows a calculation for a decision outcome.

FIG. 4 shows an example data set for buying a car.

FIG. 5 shows an example of a score for each potential car model for purchase, based on weighted factors.

FIG. 6 shows an example of weightings in a combined model.

FIG. 7 shows an example of adjusted decision calculation scores.

FIG. 8 shows an example of a table of predicates, thresholds and weightings as a function of category number.

FIG. 12 shows an example of model factor categorizations.

FIG. 14 shows example factors and categories for use in a spreadsheet configuration.

FIG. 15 shows an example of factor prioritization.

FIG. 16A shows an example in which a non-linear scale is used to increase/decrease the importance of a particular factor/category pair relative to others. FIG. 16B shows an example of a matrix in which Category scores are a multiple of their Factor score, and the Target Score is some multiple of the total Factor Scores.

FIG. 17 shows an example of decision features.

FIGS. 19 to 21 show successive parts of an entity relationship diagram example.

FIG. 23 shows a matrix of example features, category thresholds and category weightings.

FIG. 24 shows example test cases.

FIG. 25 shows example results produced by a software advisor.

FIG. 26 shows example test cases.

FIG. 27 shows example training data.

FIG. 28 shows an example of Liquid Wealth Learnt GSM for calculation input.

FIG. 29 shows an example of Retirement Wealth Learnt GSM for calculation input.

FIGS. 30 and 31 show an example of GSM—Generalising & categorising the data.

FIG. 33 shows an example of separating factors into those with the highest weighting, mid weighting and lower rating.

FIG. 35 shows an example of test case evaluation.

FIG. 36 shows an example of test case evaluation.

FIGS. 42-44 show selected columns from a spreadsheet, showing an example of data points and scoring output used in an example of a computer-implemented method of the invention.

FIG. 43 sits below FIG. 42.

FIG. 44 sits below FIG. 43.

FIGS. 45-47 show Factors used in a spreadsheet implementing an example of a computer-implemented method of the invention.

FIG. 46 sits below FIG. 45.

FIG. 47 sits below FIG. 46.

FIGS. 48-50 show Categories used in a spreadsheet implementing an example of a computer-implemented method of the invention.

FIG. 49 sits below FIG. 48.

FIG. 50 sits below FIG. 49.

DETAILED DESCRIPTION

Figure 1:
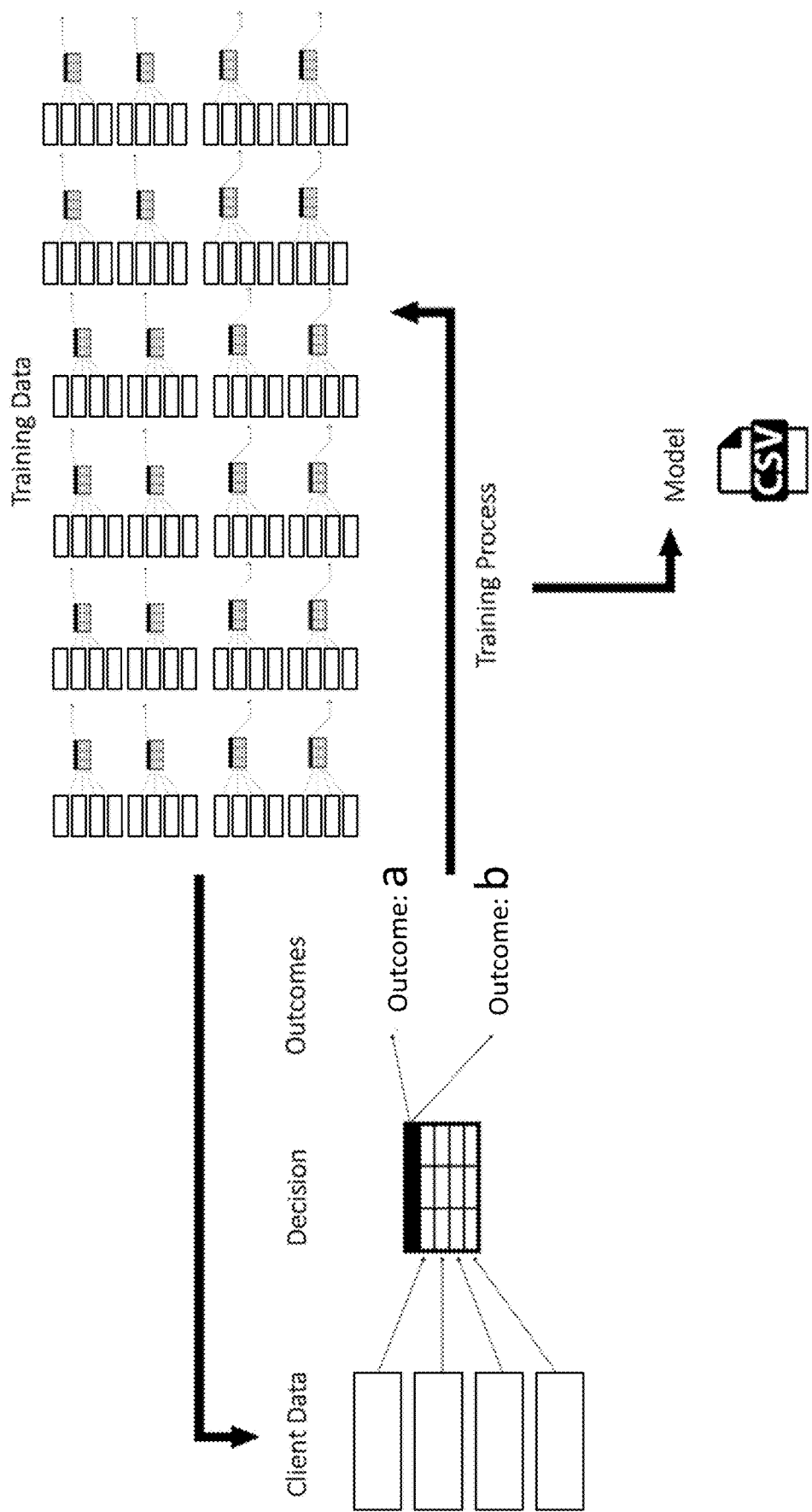
FIG. 1 shows a schematic diagram of an approach to providing an automated advice model.

We describe the artificial intelligence (AI), the clever stuff, inside our advice software e.g. our financial advice software. This is powering up our technology to help organizations, e.g. Financial organizations, to give more efficient, consistent and safe advice in minutes, rather than in days or weeks.

Consistent: The advice software can analyse your existing approach to giving advice and rapidly configure your AI robo-adviser to replicate this advice policy. This enables the advice software to protect and enhance your brand identity, whilst delivering a cutting-edge and scalable advice solution.

Proof: we took a selection of completed cases and used those to train our AI robo-adviser to be able to advise in the same way as our partner has.

Compliant: The advice software supports safe and compliant advice, and it can also be used to rapidly check that safe and compliant advice is being delivered by traditional advisers. This process enables anomalies and outliers to be identified and highlighted for further investigation.

Proof: We have machines and a team of people working full time to ensure that our AI robo-adviser is giving the best possible advice.

Goals: Our vision is unlocking the adviser of the future, bringing nearer a better world in which financial advice becomes accessible and affordable to everyone.

1. Partnering with great brands
2. Huge untapped market. Growth.
3. We're pushing the boundaries Proof: we have an AI lab working on the next generation of advice, which includes voice, chat, emotive robots and computer vision.

Overview

General Solution Mapping (GSM) is a new way of approaching the automation of decision making. It covers both the process of codifying and communicating a decision approach and the implementation of the automation of that decision. Using examples of good decisions, and the factors which were considered when making them, Artificial Intelligence then completes the work of understanding the basis on which decisions were made. A key advantage is that the human expert currently making the decision is not required to describe their decision-making process.

With GSM you can take past examples of decisions which have been made (and which are known to be right or have been checked as being right) and use them to understand what makes, or made, a good decision.

First, constraints are imposed on the advice software by listing the items in the fact find (data set) which an adviser would deem appropriate to consider in their decision, then:

The advice software is calibrated/trained using past cases.

GSM also enables you to look at past decisions to create a house view, or at least to understand what preferences your organization previously took. You may obtain a definition of the risk profile that your organization has previously been working to. The actual risk profile your organization worked to, and the actual risk profile that it undertook (or carried out) could be different.

With GSM we are able to learn the actual risk profile that was undertaken; we expect this may be different to the stated organization's view. This is because most organization's views take the form of guidance rather than explicit policy; so, we learn the exceptions rather than just the policy.

We also have the ability to configure an organization's view based on policy as stated by the organization, and then compare the differences we learn from past cases.

With GSM it is possible to run a complete check on past cases (advice given) to identify if there are any anomalies. Therefore, if it is possible to identify the anomalies or where the advice did not fit the intended advice profile, it is possible to correct them.

This would help a firm find any mistakes or anomalies in the past and correct them.

Does the GSM enable you to identify if there has been a tendency to advise in a particular way? Might that lead you to see if there has been any bias in the advice that has been given, or potentially to see if there has been any mis-selling?

Yes, with GSM we learn the direction (for or against an option) and magnitude of contribution for each factor; so we would be able to tell if advice was always being based on the same things. We could also manually assess the learnt model, to judge if it is intuitively acceptable.

We are also able to learn the view of individual advisers, or even of a client demographic (e.g. clients over age 75 only) simply by restricting the data set we train on. From this we would be able to compare a particular adviser within a firm to the firm's house view.

GSM enables the identification of any tendency to advise in a particular way.

From this position it is possible to identify any bias in the advice that has been given, or if there has been any mis-selling.

The theory of GSM may also be able to be used in the context of other advisory industries (e.g.: medical or legal) where one can create a set of parameters and look to see whether the advice that was actually given in the past fell within the acceptable level of advice of what constitutes "good advice"?

This approach may be used wherever someone (e.g. a professional) is using their judgement/intuition to give advice.

For example, where:
the list of acceptable parameters can be provided,
the potential outputs of the decision defined (i.e. advice is either option a. or option b.) and
past examples are available
the process is to:
use past examples of "good advice" as training data; any new case (i.e. set of data for each of the defined parameters) is tested against that training data.

Where new advice is being given, GSM makes a new recommendation, as it is only given the inputs.

The same approach would be taken to test previously given advice which is not known to be good or bad; we would generate new advice through GSM and test this against the advice which was previously given by a human.

This test would tell us, if the outcomes matched, and if the rationale for reaching the outcome matched.

BACKGROUND

When making decisions, people generally consider the relevant information and make a judgement based on their intuition. By intuition we mean the ability to know valid solutions to problems when faced with complex situations, without the need for conscious reasoning. This is typically thought to be achieved via the application of accumulated knowledge and experience, to the constraints imposed by the situation when information is partial and goals poorly defined.

The important point being, this is achieved without the need for conscious reasoning.

Expert Systems

By way of contrast, in an Expert System, the full knowledge of the expert (financial adviser) is digitised, and is used in the decision-making algorithm. The expert specifies all steps he took to make the decision, the basis for doing the same, and how to handle exceptions. The system would then try to follow exact rules from the expert.

A Problem with Expert Systems

Building an expert system presupposes two things:
1. The expert uses a series of describable steps to make their decision
2. the decision-making boundaries at each of these steps can be described in absolute terms.

This creates a problem as the human expert is forced to describe logical progression of steps for making a decision, with explicit conditions at each step, when in reality these might not exist. This may force the human expert to make arbitrary definitions which are difficult to justify.

Our Approach

In an example, GSM requires of the human expert, the elements of the decision-making process which they can easily and confidently offer up, namely, the boundaries of the decision being made, and the information (factors) which can be used in making that decision. Past examples of decisions which have been made are then provided and used to train an algorithm on the use of information to make a correct decision.

In a high level example of our approach, an initial model is established of how client data is processed to arrive at decisions, which provide outcomes. The model is then trained on training data. A trained model is then output, for example in a simple file format used to store tabular data, such as a spreadsheet or database (e.g. comma-separated values (CSV) format). An example of our approach, in schematic form, is shown in FIG. 1.

Benefits of GSM

1. Quick to Prototype

Due to the nature of GSM, we are able to quickly create prototypical models (e.g. using excel, or even a white board or piece of paper), to test our thinking about the factors considering in a decision, map potential outcomes and test these ideas against all the available examples.

Nature of Benefit:
Speed to market;
Reduced Delivery Risk
Rapid prototyping results in rapid validation of ideas or identification of mistakes.

Example: Pension Consolidation, Shown Below

2. Avoids the Creation of Arbitrary Corporate Policy

At no point does GSM require an organisation to make explicit/absolute policy statements about its position on a given step in a decision making process. With other approaches, there is a requirement for confirmation on boundary conditions and thresholds, when in reality this policy does not and should not exist. There are desirable vagaries in the way these decisions are made which are lost when an absolute policy is forced.

Nature of Benefit:
Speed to market;
Reduced cost to implement

Often this policy does not exist in absolute terms (only as guidance), and the process of defining and approving it within an organisation can require a lot of resources.

EXAMPLE

In defined benefit (DB) Transfer Advice, Critical Yield is an important factor. Percentages above c.6% are generally inferred as opposing a transfer, and below might be considered in support. However, agreement on exactly where this threshold should be does not exist. To implement this decision in another system would have required the definition of a policy, i.e. exactly where should this line be drawn? 6%, 6.2%, 5.8%, 5.85% etc?

The reality is there is no correct answer, and GSM allows the nuances of this point to be derived rather than stated.

3. Self-Documenting House View

The system helps you to work out your house view quickly and documents it for you. A side benefit of this is that an advisor will be less inclined to state "we're being sued for mis-selling and we didn't understand your thing".

4. Truly General

Works with the majority or maybe all new capabilities. This in turn will give us a consistent approach to how we do things across products.

5. Quick Change

Lowers the risk of implementing something that the customer doesn't really like. It's much easier to change 6. Confidence to Change Gives us confidence to change things more quickly as we can do it more safely. This in turn will make people more comfortable with starting off with something sufficient.

7. Remove Reliance on Single Expert

This implies that we don't need to rely so much on a single customer expert, who's an expert in both advice, and our way of implementing robo advice.

8. Reduced Governance Risk

Reduces risk when it comes to sign off advice policy.

GSM Theory

Multi-Attribute Utility Theory

When making a decision, we often think in terms of our preferences for one aspect of the thing which we are deciding on over the other, i.e. when deciding between two or more options we consider the attributes of those options.

One Attribute

In simple terms, you might first consider how you decide which apple to buy in a supermarket. First consider that the only difference between them, the only attribute, is their cost. Generally, we can assume that people want to spend the least money possible; the preference is likely that the cheapest apple will be selected. Here, apple 2 is selected, as shown in FIG. 2A.

Two Attributes

Suppose that colour of the apple was also important, i.e. there are multiple attributes to consider. First, we need a way of categorising the Apple's colour. If the preference is for a Red apple, we might define how Red it is.

We might do so simply as a boolean, Red/Not Red. Or, to allow for more information we might consider these on a three point scale; 3=Red, 2=Mixed, 1=Green. The two attributes (cost and redness) values for the three apples are shown in FIG. 2B.

However, this does not yet allow us to make a decision, as we need to capture the preference for each of these two attributes. A consumer may well be willing to pay a lot just to have that red apple; or actually the consumer may have said colour was important, but really the consumer cares much more about price.

To deal with this, we do two things:

1. We add a weight to the attribute, this shows its relative importance in the decision
a. We might say that cost is three times as important as colour 2. We normalise the attribute values into a % in the direction of our preference
a. £1.05 becomes 0% as it is the most expensive (and therefore least preferential on that dimension)
b. 35p becomes 100% as it is the most preferential.

The calculation for the decision outcome (decision: apple 2) is shown in FIG. 3A.

Three Attributes

One further example: consider freshness is also important, and that regardless of cost or colour you would never buy an apple that was not fresh. Given your preference here is binary, we might represent this as 100% or 0%. We want to see an outcome which isn't Apple 2, so let's assume that apple 2 is rotten:

The calculation for the decision outcome (decision: apple 1) is shown in FIG. 3B.

The method of producing the decision outcome based on the attributes (or factors) and their respective values and weightings, may be thought of as an example of a rule for producing the decision outcome.

Example: Buying a Car

This approach is often used in procurement, say when a big business is considering a new customer relationship management (CRM) system implementation which will affect lots of different departments in different ways. Here, we'll consider a car purchase.

An example data set is shown in FIG. 4.

Often people refer to feature comparison charts, and the principle carries well. It is important first to select the bits of data which are important to the decision we are making; this is likely to be a subset of the total, and naturally we should look to make the set of data as small as possible.

An example of a score for each potential car model for purchase, based on weighted factors, is shown in FIG. 5. The result is that the Model S is recommended. It should probably not be a surprise, as it scored really highly in some critical areas like user reviews, Prestige and Range.

Combining Preferences

Imagining this is a combined purchase between a couple, we have person A's preference's above . . . but person B views things very differently.

Assuming both people have equal voting rights—we can simply combine the scores to give a combined model.

The combined model results are shown in FIG. 6. The adjusted decision calculation scores are shown in FIG. 7. The adjusted decision is that the Prius is selected.

Limitations of the Theory

There are two key limitations with this theory, 1. it presumes a simple progression of attribute/preference assessment, when really this is non-linear;
a. using the car example, if I have £35,000 to spend on a new car the difference between cars worth £34,000 and £36,000 is not identical to cars worth £32,000 and £34,000; and a car that costs £75,000 is effectively in the same group as the £36,000, namely "too expensive".

2. Considering the additional complexity required by 1, people aren't generally well able to articulate with any detail/accuracy/confidence the relative preferences
a. i.e. in the car example,
i. people can quite easily say which factors they considered and what car they would pick
ii. people can not easily say if the attribute range was an 8 or a 9 weighting.

Categories: Mileage Example

In Limitations of the Theory we considered the fact our preference for a given attribute is non-linear. The solution to this under GSM is the concept of factor Categories.

EXAMPLE

Continuing with the example of deciding which car I should buy, consider the attribute of current mileage. When I recently bought a car, I wanted something that was a few years old, with reasonable mileage. I thought reasonable mileage to be around 30,000. The reality was, +/−5,000 would have very little impact on my decision, in fact +/−10,000 would also be very acceptable. However, outside that range, mileage quickly became a reason why I wouldn't want to buy the car. For example, cars with Mileage of 10,000 or 60,000 would definitely not be acceptable to me.

Categories

Figure 9:
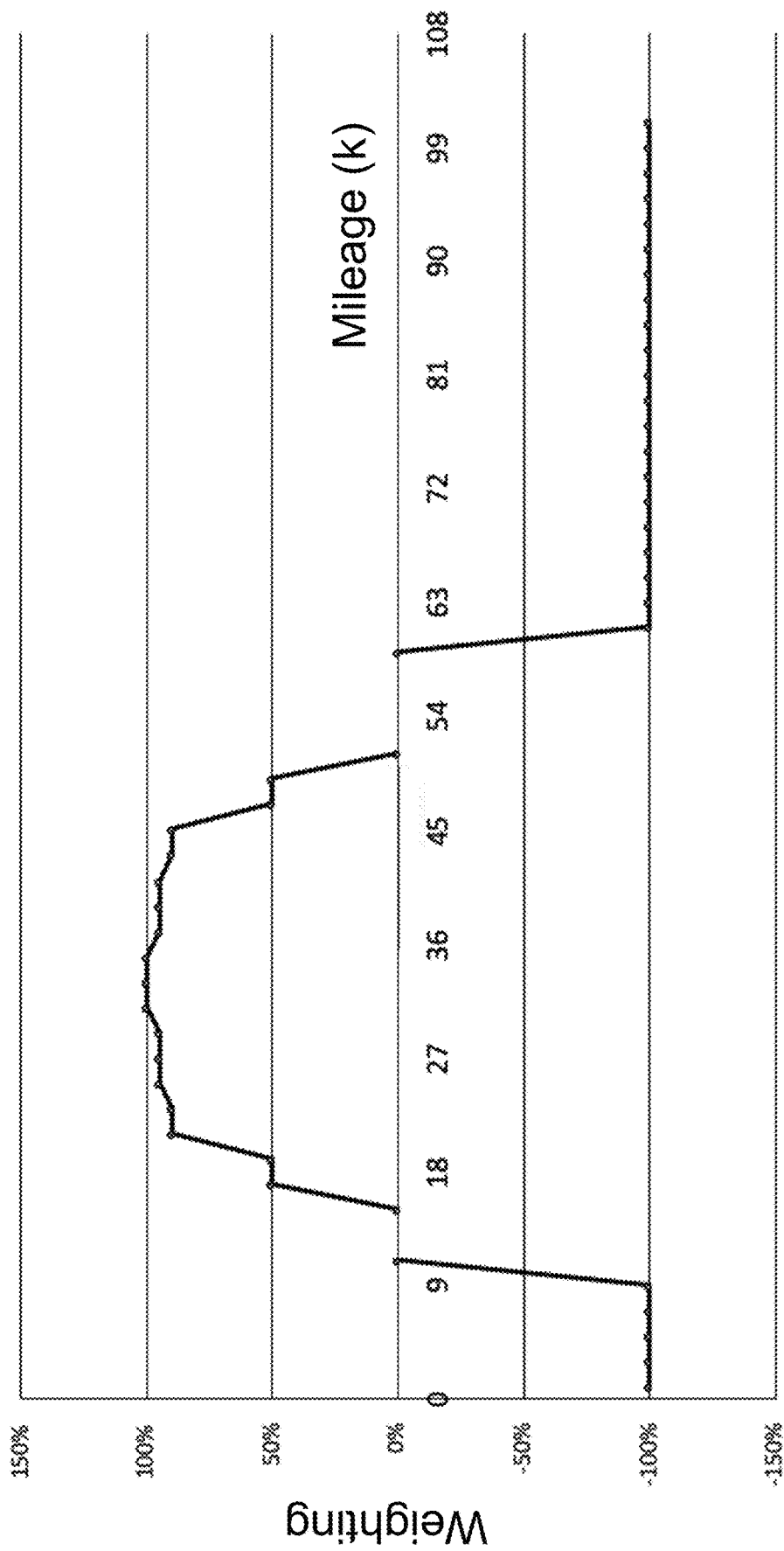
FIG. 9 shows an example of a chart of weighting as a function of mileage, in relation to the table of FIG. 8.

To deal with this, we draw lines along the mileage scale, each representing a threshold over which the % allocation of points changes. This creates steps in our weightings as per the table in FIG. 8 and chart in FIG. 9.

The "Summary" Attribute of Categories

When building these models, in practice, we often limit ourselves to three notional categories—high, medium and low. This may be simply for ease of conversation. In an example, GSM has a space for each category to be given: a Summary. Each summary can be used multiple times, so we can include n categories, but map them to e.g. two or three outcomes. e.g. categories 1-3 might have a summary of "low", 4-8 would be "medium" and 9-11 "High". This would mean we could add even more categories if needed for the model, but still keep our presentation to the user nice and simple.

GSM Component Summary

A. Product Management Processes

1. Discovery; related to the identification and definition of a new decision.
2. Calibration; refinement once the new decision has been implemented.
3. Governance; the process and documentation related to GSM for this purpose.

Figure 11:
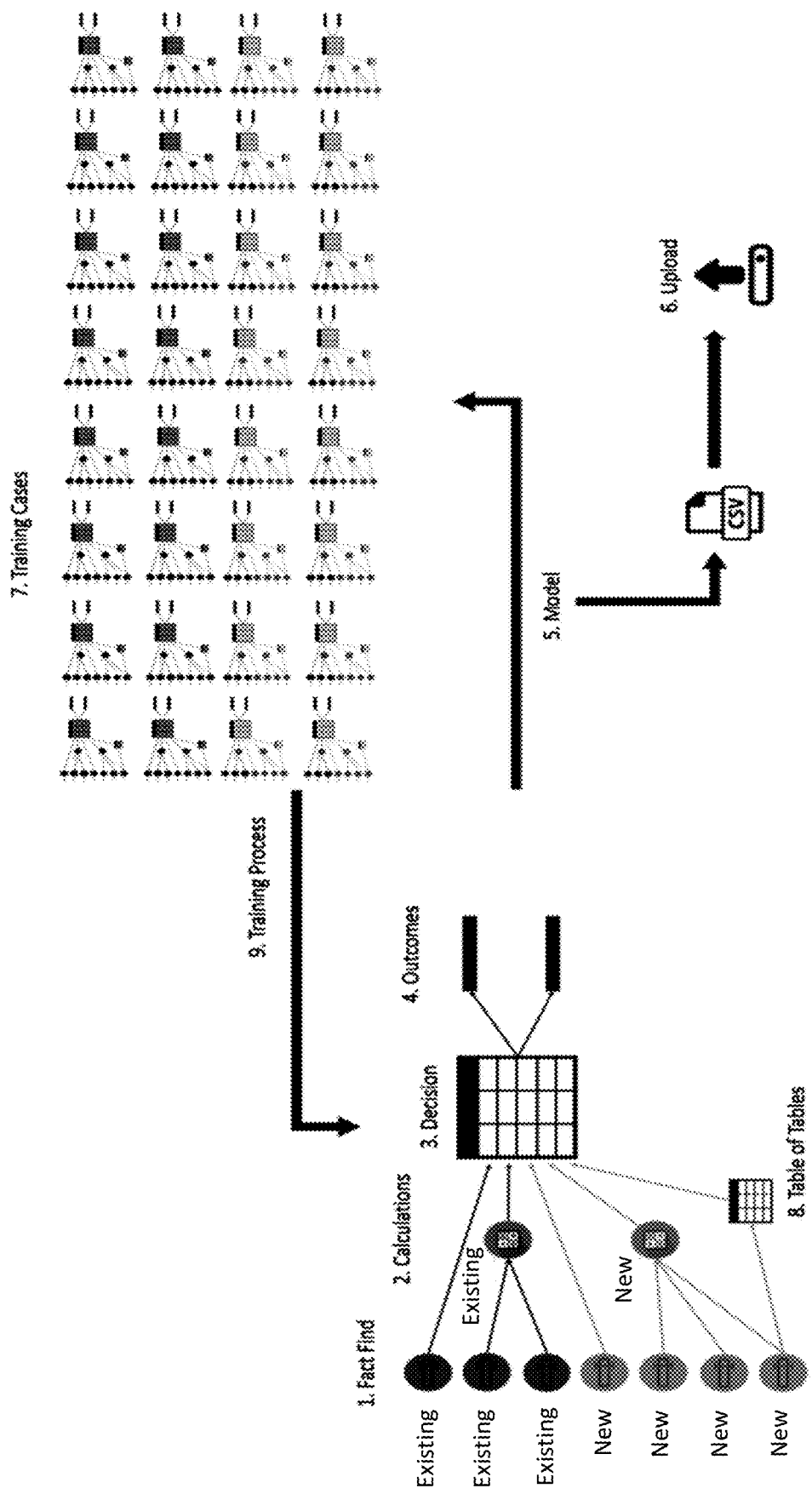
FIG. 11 shows example implementation, components and processes in an example General Solution Mapping system and method.

B. Implementation, components and processes (see e.g. FIG. 11)

4. The decision model (1-4, 8)
5. The training process (7, 9)
6. Submission—final implementation (5, 6).

GSM Fundamentals

GSM fundamentally works by identifying the pieces of data in a set of data which can be considered in a given decision. The potential values that factor (e.g. a % within the range of 0-100) are truncated into a number of categories. Each category has a predicate and a weight, and each factor also has a weight. We then define the possible outcomes (also stored in the data set). Machine Learning algorithms are then used to determine the correct factor and category weightings and the correct category thresholds (i.e. is the threshold for a given category 40% or 45%). Machine Learning does this by trial and error testing of different values for each of these variables against a set of test data—i.e. iterating over different values to see if the score achieved is closer or further from the desired (test case) outcomes.

The implementation is one of a decision table, however a similar result could be achieved by using a decision tree type approach, with the algorithm optimising the nodes, and their values.

GSM Discovery Process

This is based on the process followed to define the defined benefit (DB) Transfer model, with a little bit of simplification based on reflection.

Step-by-Step Guide

Figure 13:
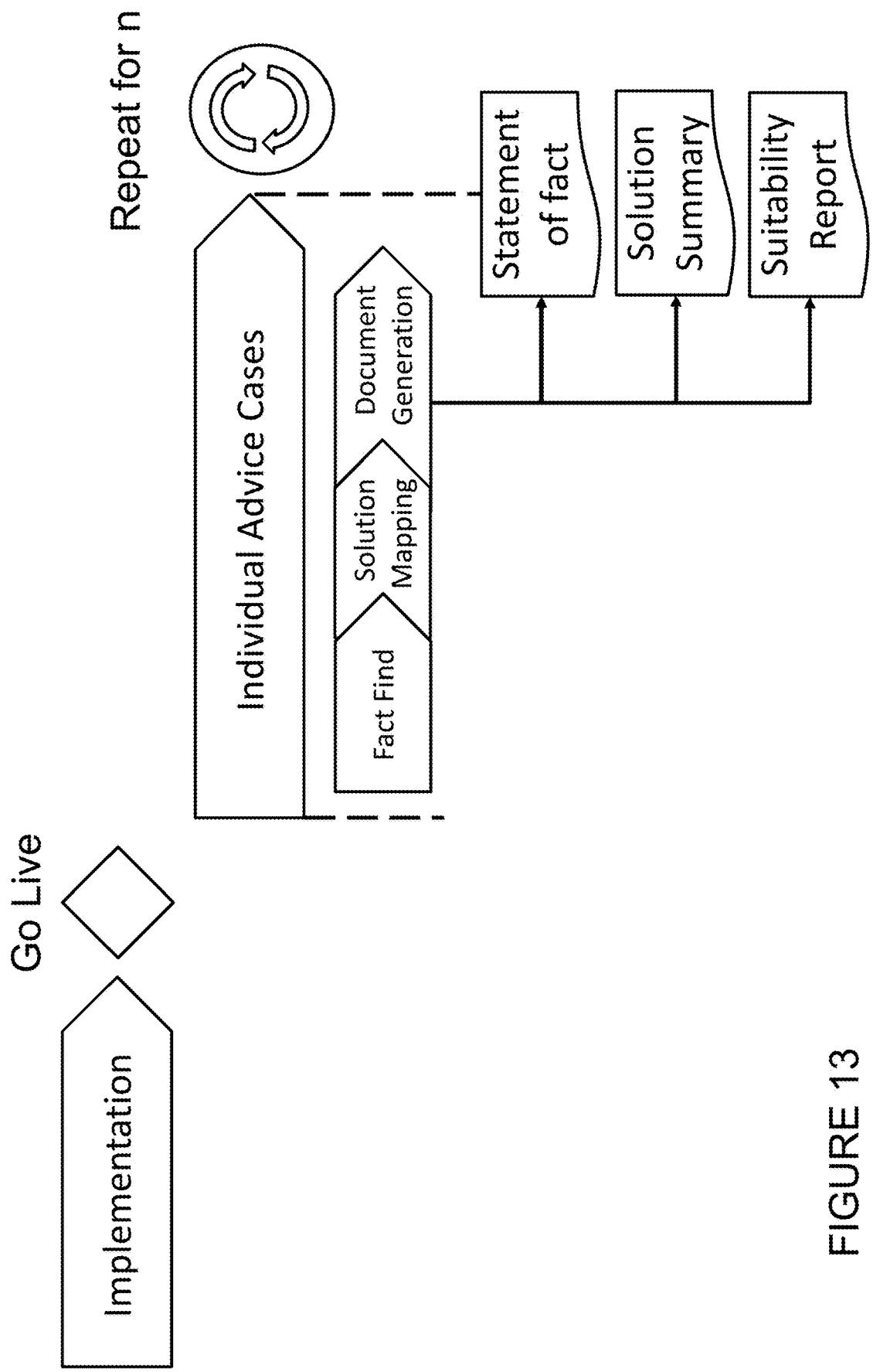
FIG. 13 shows an example of a method for Presenting Automated Advice Under GSM.

1. Identify in the simplest terms possible,
a. What are the super decisions (e.g. DB transfer/don't DB transfer, Annuity/Drawdown, Invest/Remain in cash)—there is likely to be max 2-3 of these
b. what the key advice end points are (i.e. what solutions could we offer). This is likely to be:
i. A matrix of products/feature configurations (e.g. Individual Savings Account (ISA)/General Investment Account (GIA)/Single Premium Bond (SPB)/Lifetime Individual Savings Account (LISA) and fund)
ii. A number of do nothing/look elsewhere statements (e.g. don't invest, don't transfer your DB pot)
2. Get your advisers in a room/skype for 30 minutes (time boxed)
a. hand out post-it notes and pens
b. set a 10 minute timer and ask everyone to work separately generating a pile of 'things which they take into account when making a recommendation'. Good examples would be: the clients Attitude To Risk (ATR), the client's health, the clients age, the client's capacity for loss
c. Review the notes and agree a common set. The more the better, trivial things are worth keeping
d. These should then be sorted into groups of importance to the decision:
i. High
ii. Medium
iii. Low
e. Finally, are there any of these notes which are of:
i. super-high importance, (e.g. capacity for loss, if you don't have it you should never, ever, transfer your DB pension)
ii. super-low importance,
f. Stretch task, 5-minute time box—"can you think of any hard and fast advice policy/house view/business rules". Example, ATR<3 don't invest, keep your money in the bank.
g. repeat this for each of your super decisions
h. Note, our approach assumes additive independence: that the contribution of each property to the decision is independent of the values of the other properties. So conversations like 'ATR is really important if the client is in good health, but Capacity for loss replaces ATR as important if they are in poor health' are interesting but not helpful/required. People often think in these terms, so the conversation will tend this way. It might be that there is a missing super decision, e.g. if we make our decision based on different things if a client is in ill health, compared with when they are not—ill health is not a factor it is a super decision. An example from DB. If a client is in good health the decision we are making is do they a. want to keep their guaranteed income arrangement, or b. are they better off moving into a Drawdown (DD) arrangement. If the client is in ill health, the first decision to transfer is still relevant, but if we rule out DD we might look at another decision a. the DB scheme offers the highest guaranteed income/b, due to ill health the client will get a better guaranteed income if they transfer and buy an annuity.
3. Create 10 case studies (personas),
a. They should have names and a back story
b. They should have a value for each of the factors identified in step 1.
i. some of these will be evident, e.g. the value for ATR will be an integer between 0-10, ii. some less so, e.g. health or capacity for loss
iii. it is important that the value used is some kind of number, e.g. for health you might use good, poor, seriously ill (i.e. 1, 2, 3), capacity for loss might be limited, moderate, significant (1, 2, 3)
iv. unless there is an evident value (e.g. ATR) keeping to a high, medium, low (1, 2, 3) value range seems to work
v. note, the case study should use the word not the number (e.g. you would state that case study 1 has limited capacity for loss, knowing that later this will be converted to a value of 1)
4. Ask advisers (as many as possible, ideally 6) to give their views on the personas
a. picking for the list of possible endpoints,
i. what would they recommend, and
ii. why would they recommend that (hopefully here they will refer to the notes generated in
2. if they don't, consider adding a new factor to your model)
b. how confident are they in that decision (out of 100%)
c. what information did they use (from the persona) in coming up with that recommendation
d. what other information would they have expected to see
e. what would they have needed to get their confidence up to 100%
f. This seems to work quite well asking an adviser to complete this in a spreadsheet—but it could equally be an interview
g. The more detail the better, like the persona though—a chunky paragraph or two is probably enough
5. intuitive model created
6. test and adjust—on the basis of why did it not work, if it did not work.
7. Machine Learning (ML) round one
8. assess suggested changes—acceptable?
9. iterate in complexity—i.e. keep adding to your case studies until they
a. cover 100% of potential scenarios
b. cover 100% of the journey (i.e. inc. SR etc.)
10. Note, there is another half to this work—the model wants to consume a single number per factor (e.g. ATR), that is often going to be an unacceptable user experience (UX)—there will be some work involved in creating a suitable way to derive that assessment (e.g. with ATR, we have 12 questions plus a bit of logic); hopefully we already have a mechanism—if not, we can start in Robo Paraplanner (RPP) simply by asking the adviser to state their assessment (e.g. capacity loss could start with the adviser having a big long conversation with the client recorded in notes, and resulting in the adviser selecting a high/medium/low radio button . . . over time we can review these conversations and design a UX/user interface (UI) to first support this conversation and then fully Direct-to-Consumer (D2C) it (of course with capacity for loss we already have a solution . . . )
DB Transfer Example of GSM
Model Factor Categorisation
An example is given in FIG. 12.
Presenting Automated Advice Under GSM, Example
If we consider the high-level business process for giving a piece of advice, i.e. the post-go-live repeatable process, there are three fundamental stages; gathering information (fact find), processing and that information (solution mapping), and presenting information back to the user (Document Generation). Document generation provides Statement of Fact, Solution Summary and Suitability Report. This process may be repeated for a plurality of individual advice cases. Therefore, the three documents produced are the available ways by which any determination made under GSM can be communicated to the user (by user this can mean adviser or the client/consumer of advice, as the approach is the same). An example is given in FIG. 13.
Statement of Fact
Not Impacted
  The purpose of the statement of fact is to provide a reference and record of all the information used to give advice
  It is therefore not affected by the ways of solution mapping, and will simply replay the inputs as before.
Solution Summary
Impacted
  The solution summary provides an overview of the advice given, the reasons for it, and the outputs and/or workings of any calculations or analysis which was completed in the process of generating advice.
  Regardless of the method of solution mapping (i.e. GSM or not GSM) this purpose needs to be met.
  GSM will not change the fact calculations are completed and replayed in the solution summary, so the impact is restricted to decisions made about the right course of action and the reasons that it is appropriate.
  This is achieved with three elements
    1. Decision Outcome—of the options available, which has been selected.
    2. Factor Groupings—for each of the factors considered in the decision, in what direction and of what magnitude did they contribute to the outcome.
    3. Input Values—for each factor, what value was used (i.e. input) in the decision.
Suitability Report
Impacted
  The suitability report contains detail of the advice given, the reasons for it, and any risks or considerations the client should be aware of in relation to the recommendation and details of the thing recommended.
  Regardless of the method of solution mapping (i.e. GSM or not GSM) this purpose needs to be met.
  GSM will not change the method of describing details about the action recommended, so the impact is restricted to explaining the recommendation, the reasons for it and any associated risks.
  This is achieved with two elements
    1. Decision Outcome—of the options available, which has been recommended.
    2. Factor Groupings—for each of the factors considered in the decision, which supported the recommendation (and to what degree of magnitude) and which pose a risk due to not supporting the recommendation.

Example Excel Configuration

Format:
What we're expecting is e.g. two CSV files, which can come from two sheets in the same Excel workbook. In each case, the columns described below must be present, you can add anything else (e.g. notes, the identifier associated with a ticket in a work management system) but do it in other columns (i.e. don't put them in the same cell as configuration fields), and the fields below must be formatted as described. The columns can be in any order. An example is shown in FIG. 14.

We've added a 'source' column that indicates where to find a field:
- clientFacts: it's in the top level of the fact find
- dbPension: it's a fact about the pension (i.e. it's in an object in the db_pensions array on the fact find)
- analysis: it's a calculated fact, and an analysis module will put it in the results object in the solution
- dbPensionsAnalysis: it's a fact about the pension analysis (Transfer Value Analysis Service (TVAS))
- you could, in principle, add other sources for things that are discovered from e.g. Intelliflo, Experian, Facebook . . . .

Initial Concept: Dynamic Scoring

When approaching the design of our new DB Transfer product, we expect to generate a list of Factors, which will have a number of potential outcome Categories, each of which—to a greater or lesser extent—support or do not support advice to transfer. Each Factor will have a differing weight on the transfer determination, and some Categories of specific Factors may be individually sufficient to rule against a transfer (trap door).

An example prioritisation is shown in FIG. 15.

We need to be able to ask the client to score themselves (self-select a Category) in some instances.

We need to be able to play back the Factor Category to the client in simple terms (e.g. Average, Above Average, Below Average).

We may in some cases need more Categories—than are required for Transfer advice—associated to the Factor to support some other element of the process (e.g. 10 ATR Categories needed for investment advice, but for DB transfer we only need 3 groups).

We know that the number of and the relative weight of each Factor, the number of and weight of each Category, and the potentially trap door Factor/Category's will differ between parties which are using this system.

We expect these changes during implementation as the house view is calibrated.

We expect these changes after implementation through continuous improvement and in reaction to regulatory change.

We looked to discover a method through which all the above could be achieved as configuration—so change is easy to make and maintain (across multiple parties which are using this system).

1. Rather than having any logic built into the DB Transfer Wizard, we desired simply to have a single, configurable Target Score which must be attained for a positive transfer outcome.

Each Factor.Category pair would have a numeric value, and the result would simply be compared against the Target Score This way, additional Factors and Categories could be included with the only adjustment required to the Target Score, and weightings could also be adjusted without the other Factors being impacted.

A non-linear scale may be used to increase/decrease the importance of a particular factor/category pair relative to others (for example where a particular pair is a very strong indicator of a given outcome). A Fibonacci sequence is an example of a non-linear scale which may be used. A non-linear scale (e.g. Fibonacci sequence) may be used to adjust for weighting and Trap Door Factor/Category pairs, e.g. taking the example of FIG. 16A, with a score over 100 required to transfer.

A matrix where Category scores are a multiple of their Factor score, and the Target Score is some multiple of the total Factor Scores in this example (see e.g. FIG. 16B), the Target Score might be 60% (so 60% the sum of Factors, (60/(100+80+70)=250)

ATR of 4=50% of Factor Score (80), so 40 this would allow us to add/remove Factors and Categories and adjust Factor, Category and Target Scores without reconsidering the whole model.

An example is shown in FIG. 16B.

Pension Consolidation

1. Background

We've identified the need for a new decision point in at retirement advice which is common across both DB transfer & defined contribution (DC) At Retirement advice capabilities should be provided. We want to make sure the solution is flexible, with new decision features easily added/removed for different parties which are using this system.

2. Use Cases a. pre-retirement; consolidating your pensions for admin simplicity, or other reasons as you accumulate wealth for retirement. Really, admin complexity isn't a good reason, but maybe cost or performance of the fund. Really focus on cost of the product you are in, vs the cost of the product you are going into. In addition to the plan charge, there is also the advice cost (initial and on-going) which must be recouped moving forward. Lack of drawdown isn't a legitimate reason to transfer pre-retirement as there isn't an immediate need to do this. Often alignment of investment funds is a consideration, but we should first check if they could do an internal switch (as this would be cheaper), but then the new adviser often doesn't know enough about the funds on offer so would usually refuse to advise it. Often access to advice and funds that the adviser has analysed and will monitor is ongoing, so they just inform the client of the cost impact before they advise.

b. at-retirement; i.e. moving pensions into a place so you can take your benefits and execute your retirement. A good reason to transfer at retirement might be, where the existing product doesn't offer drawdown.

2.a DC Context

When Pension At Retirement advice is given, the advice may be to crystallise some or all of the pension fund to provide a drawdown income/commencement lump sum. When this happens, much of the fund remains invested as the client draws income through their retirement; so responsibility for investment management and ongoing drawdown advice is taken into consideration when advising at retirement. Often, the adviser will prefer to recommend that the DC pension monies are transferred into a new DC Pension which they, having reviewed the market, feel is superior. However, before a DC to DC transfer can be recommended, the adviser must check that the new DC arrangement is superior, and that the client will not suffer a financial loss, due for example to transfer penalty, or loss of guarantees.

3.b DB Context

Where a recommendation is made to take a transfer value offer in exchange for giving up DB Pension benefits; the client will receive a lump sum from the DB scheme which must be transferred into a DC arrangement. As in the DC context, the adviser will often have a panel of DC pension providers and investment funds which they prefer to recommend following analysis. However, in cases where the client already has a DC pension, the adviser must check that the new/additional DC arrangement they are recommending is superior.

Figure 18:
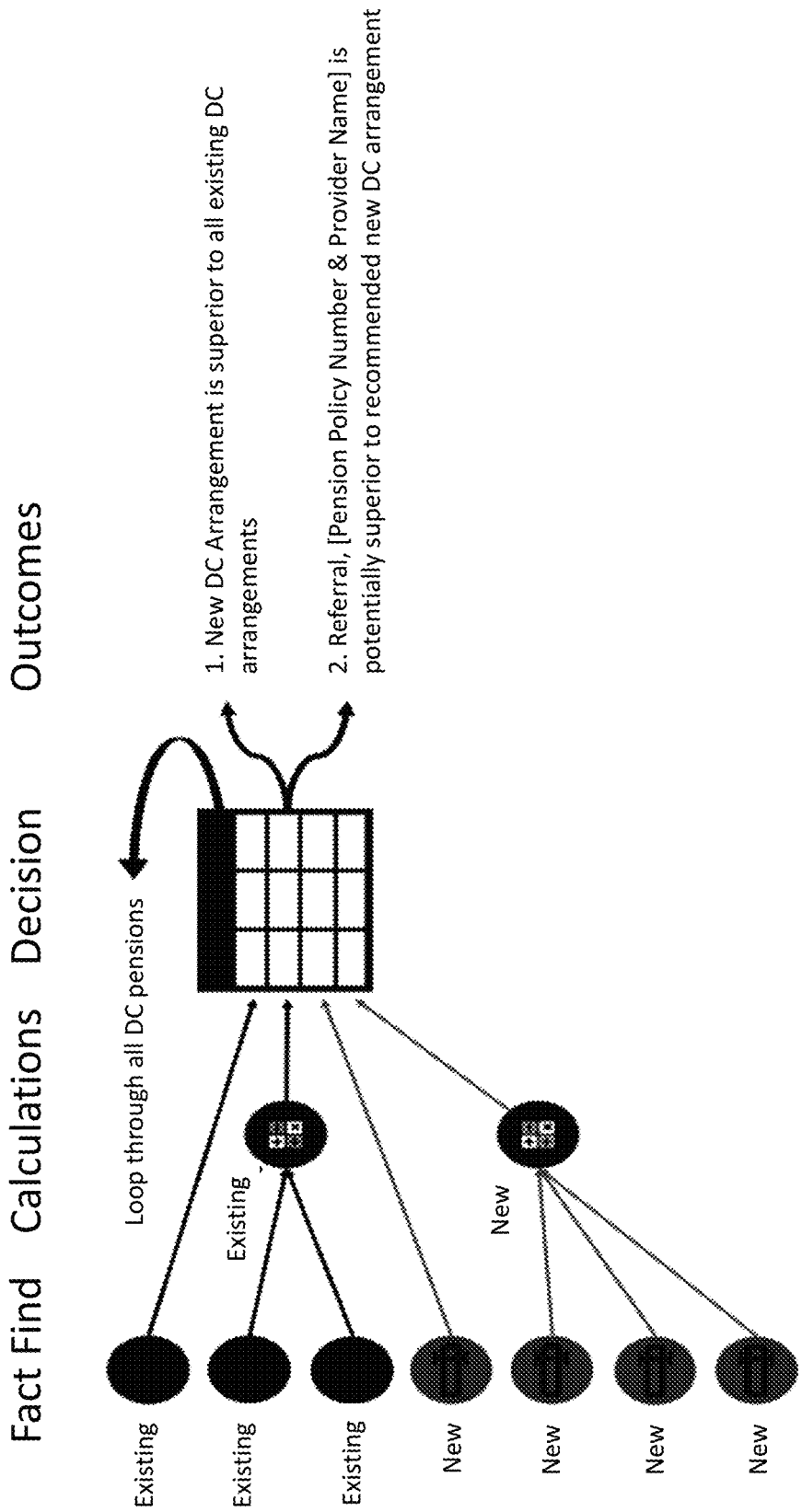
FIG. 18 shows an example of process flow.

4. Minimum Viable Proposition (MvP) Notes
    A client may have zero, one or many Existing DC arrangements (at least one in the case of DC At Retirement advice)
    All DC arrangements must be compared to the proposed new DC arrangement
    If any one DC arrangement appears to be superior or complex, the case should be referred and no further analysis is required.
5. Decision Outcomes
    New DC Arrangement is superior to All existing DC arrangements
    Existing DC Arrange/Insert existing DC Pension Policy Number and Provider Name/is potential superior to recommended new DC Arrangement=referral
    Assuming that we would highlight which DC scheme(s) is causing the referral, but perhaps also the specific features? or maybe neither for MvP?
6. Process Stage
    The suggestion is that this decision point should sit at the end of both the DB Transfer and DC At Retirement advice solution mappings; as a final check for the advice.
    It is only once a drawdown/DC arrangement is recommended that this decision becomes relevant (i.e. if advice is 100% annuity this decision is not relevant).
    Prior steps in solution mapping will be relevant inputs to the decision, e.g. charging structure and features of the new DC arrangement.
    The outcome does not otherwise (for MvP) impact solution mapping, simply generating a referral or not.
7. Decision Features
    See for example FIG. 17.
8. An example GSM in Excel may be provided.
9. Process Flow
    See for example FIG. 18.

Entity Relationship Diagram
    FIGS. 19 to 21 show successive parts of an entity relationship diagram example.

Figure 22:
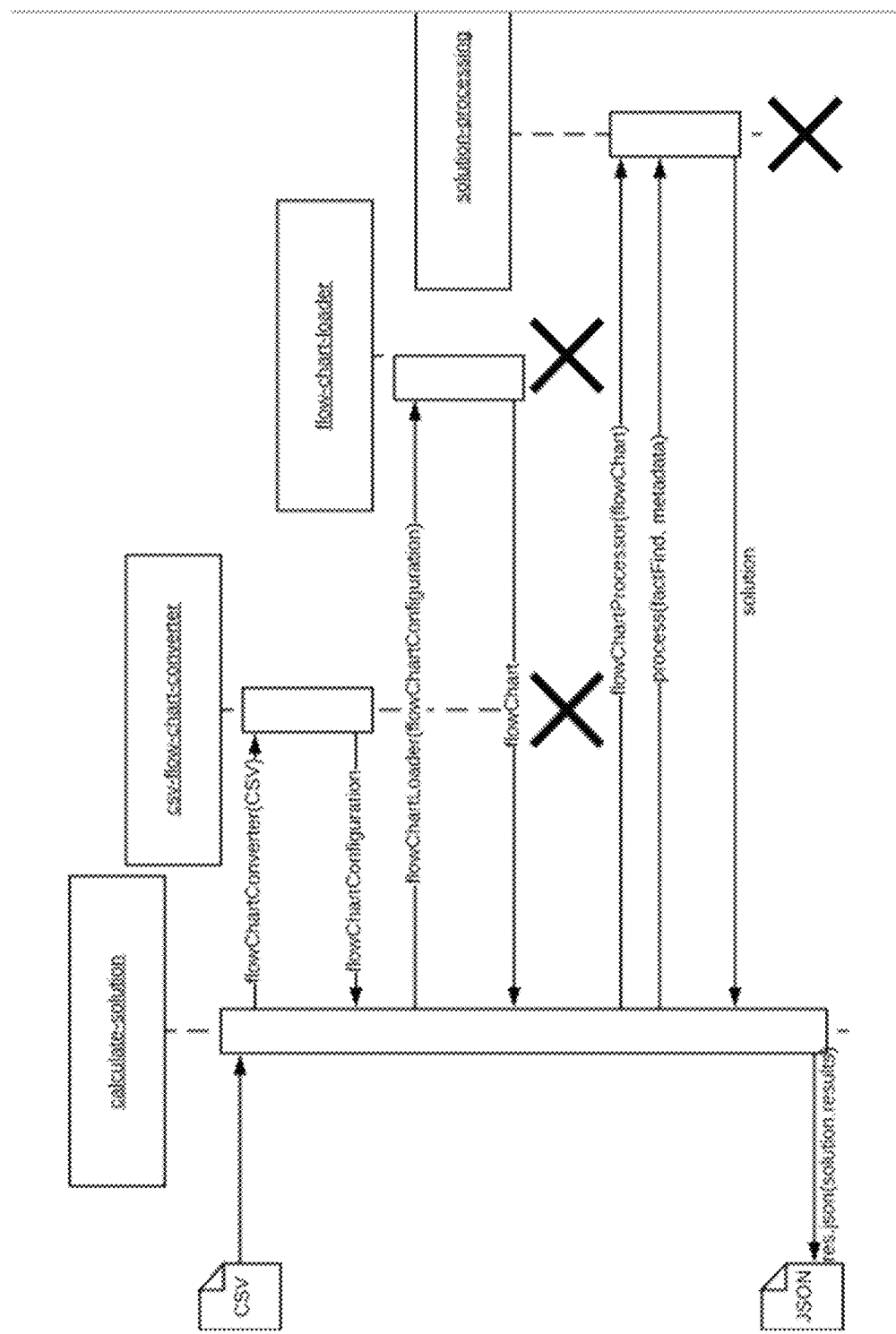
FIG. 22 shows an example of how the DB solution mapping calculator uses the CSV from a party (which is using this system) solution spreadsheet to create a solution-processing flowchart which generates the solution.

Solution Calculation Sequence
    The diagram example in FIG. 22 shows an example of how the DB solution mapping calculator uses the CSV from a party (which is using this system) solution spreadsheet to create a solution-processing flowchart which generates the solution.

GSM and Anomaly Detection
    In order to go live, we need to get a Compliance function to sign off the process that we are using to give advice. Currently this "go live" is based on compliance signing off the flow chart of the mapping or a document describing the mapping. For the GSM there will not be a document and there is a question about how to get sign off. For the GSM the following things need to be confirmed.
1. Are the thresholds in the correct location?
2. Are the weightings correct?
3. Are there any missing criteria?
    For the missing criteria question, this will be answered by checking all cases in production for a period of time.
    For the other two questions, one can see the following options.
1. Write a flow chart to describe the GSM. We do not want to do this.
2. Present the weightings to the customer. This will potentially lead to questions about what is the correct weighting for cases that are unlikely to occur.
3. Create test cases to test each part of the GSM and get the customer to confirm what the advice would be in that scenario. This again could lead to a lot of time deliberating cases that may never occur in live.
4. Use anomaly detection. If this is used then it implies that compliance sign off is based on the signing off the test cases provided rather than our method of extracting the advice from the test cases.

Conclusion
    Signing off the test cases rather than the advice method implies that compliance do not need to get into the detail of checking how our method works. If we can use anomaly detection to demonstrate to compliance that we will refer all cases that are different to the test cases then this can give compliance confidence to go live. It is believed that the combined method below provides a suitable anomaly detection method, though better methods may be possible.

Anomaly Detection
    For example, given the GSM of FIG. 23, there are the test cases of FIG. 24. In an example, these are the common tests cases that are expected to be used in the system.

Anomaly Detection Based on Thresholds
    One option for anomaly detection is to do it based on thresholds. This would work by identifying which threshold a case lies in for each feature and seeing if there is a test case that shares the same thresholds that can be used to check the answer. If there is one then the case is advised, otherwise the best outcome is calculated and the case is referred.
    For example, for cases of FIG. 25, cases 1 and 3 would be referred to an advisor, as these are threshold combinations that we do not have, because these threshold combinations are not present in FIG. 24.

Pros
    Automation. Improved reliability of advice.
Cons
    This makes the assumption that the thresholds are correct and that we have correctly assumed that the weightings are constant within the threshold.
    Anomaly detection based on proximity
    Another option is to normalise the features and then measure the proximity of a live case to a test case and then refer if the difference is too high. This is nice as it implies that we have a confidence score for each case. The problems are the disjointed nature of the GSM. The case of FIG. 26 illustrates the problem. Live Case 5 is very close to Test case 2, but because it crosses the threshold boundary it could have a very different, and possibly untested score.
    Therefore the distance between Test Case 2 and Live Case 5=sqrt((0.6−0.6)^2+(0.51−0.49)^2)=sqrt(0.0004)=0.02
    A suggestion is: Each distance could be multiplied by the feature weighting to get a weighted distance.

Pros
    Makes no assumptions about the thresholds being in the correct location and that the weightings are constant within the thresholds.
Cons
    Because two close cases could have very different results because the cases cross a boundary, it implies that the system can rate a case as close, even though it is very different in terms of outcome.

Combination
    One approach that will work is to use both of the above approaches, combined. So use the threshold approach to refer cases directly, then use the proximity approach to check cases within the threshold. This makes no assumptions about the thresholds or the weightings.

Using GSM in Calculations
    With GSM we are trying to separate opinion from fact, dealing only with opinion in GSM.

Fact: can include facts directly captured in the Fact Find, but also infer new facts (such as calculated facts, derived facts, etc); which we might also refer to as the "analysis" stage in the business process.

Often derived facts are not subject to opinion, e.g. calculating net income given gross income, or retirement age given date of retirement and date of birth, but often there are elements of opinion in a calculation examples of this are, growth rate, inflation rates, charging rate etc. used in investment growth projections An example is things like asset sub totals:

Retirement Wealth, is a fact which is derived from a client's capital and an adviser's assumption about the types of capital it is appropriate to consider as being available to fund retirement (e.g. often someone's home, and their buy to lets are excluded)

Liquid Wealth, is a fact derived from a client's capital, and an adviser's assumption about the types of capital which can be quickly spent if needed.

Question: how might we leverage GSM to learn an adviser's (by which we mean advice firm house view) opinion rather than having to request specific policy.

Suggestion:

Example training data is shown in FIG. 27.

An example of Liquid Wealth Learnt GSM for calculation input is shown in FIG. 28.

An example of Retirement Wealth Learnt GSM for calculation input is shown in FIG. 29.

GSM—Generalising & Categorising the Data

1. To generalise across multiple advice verticals (e.g. At Retirement, Investment Accumulation, Protection, Mortgages) it could be valuable to generalise/categorise the data we use as inputs to solution mapping.

2. Also, solution mapping actually uses functions of the data—there is value in distinguishing this; If a single data item is used unadjusted, the function just maps it to itself.

Figure 30:
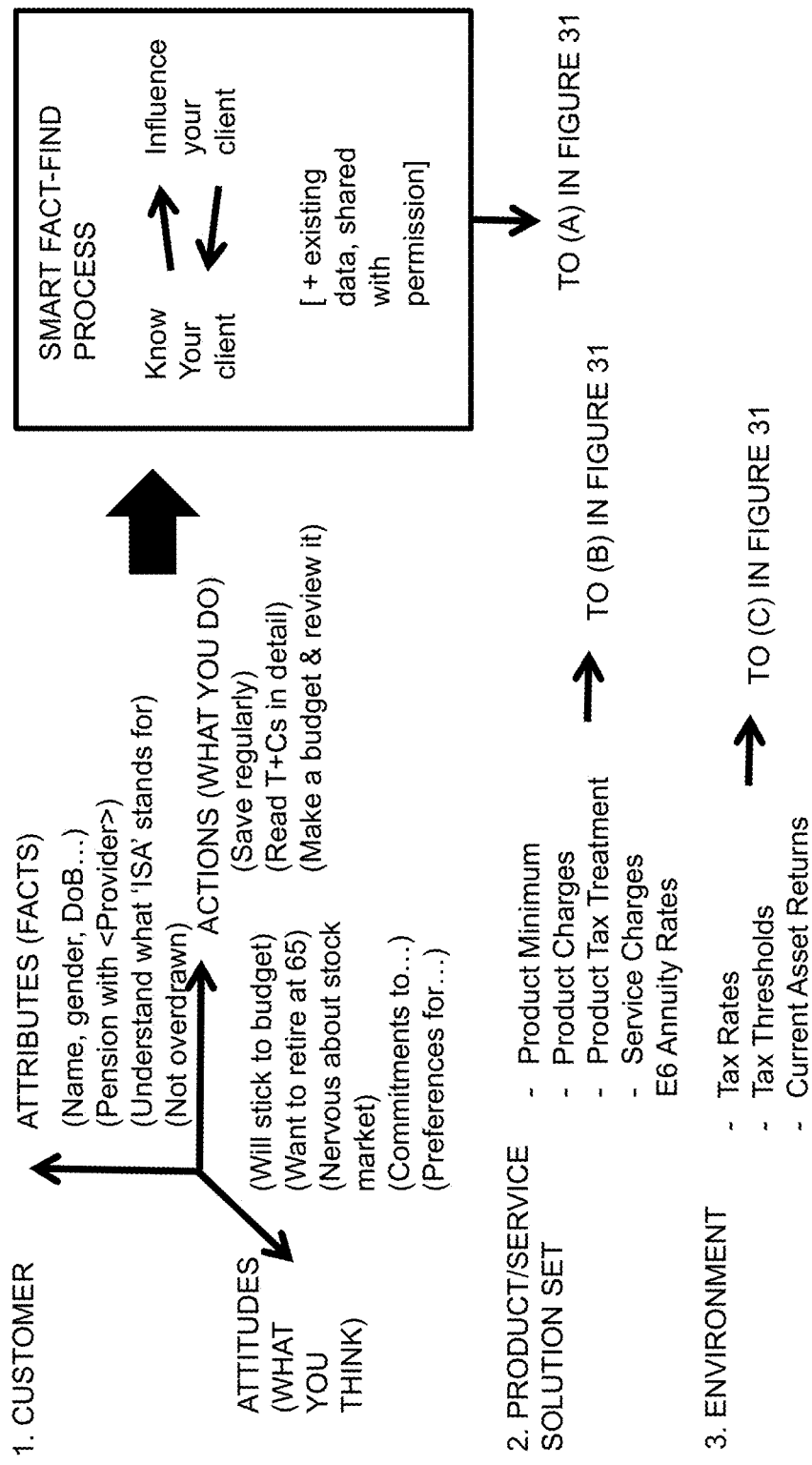

An example is shown in FIGS. 30 and 31.

Protection Advice & Skiing Downhill Analogy

Skiing Downhill

This has a lot of relevance to Protection Advice, but also Drawdown and many other areas of advice; it is also felt to be a different type of decision to that currently considered in GSM. Currently, the DB Transfer GSM decision looks at a bunch of independent features and, on balance, makes a decision. The difference with skiing down hill, is the order in which an adviser negotiates (or compromises) with a client, between the "ideal but expensive best" and the "cheapest but worst" to arrive at the "optimum value" for a given client based on the organization's view.

Protection Example

Income Protection, for an employed client aged 35 intending to retire at age 65, who has 2 weeks full sick pay only and earns £50,000.

The starting point might be to recommended maximum cover for that client. i.e. finding the provider who will offer the highest level of replacement income (£2790 pm), with guaranteed premiums, indexation, to age 65, with 2 weeks deferred period, the most reputable provider (based on claims history) and costing £100 per month. This would put the client in the best possible position should they become ill and unable to work, but it may be too expensive. The adviser may then look to compromise and find a level of cover which provides the best protection for the budget available; each of the features of the protection policy (level of cover, premium guarantee, indexation, term, deferred period, provider) represent something which could be changed to bring the cost down.

In what order would an adviser prioritise these features, i.e. which would they sacrifice first?

Would this be single pass reductions, i.e. reduce from the best to worst in one move, or would an adviser cycle through smaller rounds of adjustment?

How would relative cost of each feature affect this?

How would client circumstances affect this (i.e. if a client had large amounts of savings, might deferred period move up the list, similarly if they have a large disposable income, might level of cover be first to be reduced)?

Drawdown Example

It seems that a similar approach is relevant for drawdown, for example—first preferring to recommend indexation and leaving an inheritance before reverting to less ideal solutions; like level income and depleting the pot.

Protection Advice

It seemed that we could identify a high level flow of:

1. Establish the Needed/Ideal Level of Cover

Here we are looking basic fact finding information and determining a long list of protection a client should have For Example:

Earned Income=need for income protection

Financial Dependants (children)=Family Income Benefit

Mortgage=Decreasing Term Assurance

Note:

We don't need to order things in terms of priority or importance at this point.

We avoid any opinion (i.e. variance between parties (which are using this system) house views) as this is really matching clients to available products (income protection is designed to replace income, largely).

We disregard any consideration for existing cover at this point.

We also disregard any contingent provision they may have which could affect advice (e.g. £1 m in the bank).

The focus here is entirely on the protection the client needs, not if/how they could be met or are already met.

2. Consider Existing Cover

Here, we simply look at 1. and reduce the needed/ideal level of cover by any existing cover that is in place.

For example:

Earned income of £50k=requirement (at 1.) to protect £50k, if the client already has £10k covered, they only need a further £40k We agreed that we should not consider here anything other than protection policies designed for the specific purpose of meeting an exact need i.e. income protection needs identified in 1. could only be reduced in 2. by existing income protection policies (not cash savings etc.)

We also discussed at this point we might need to consider re-brokering existing cover. This is more complicated and potentially not that common (as people with existing cover might be less likely to use an automated advice proposition). For MvP then, we agreed that we would simply consider topping up existing cover with a new plan, i.e. cancellation/replacement and varying existing cover are not in scope.

Again, we can avoid opinion here
3. Initial Recommendation
    Building on 2. this type is simply a matter of obtaining quotes for the cover identified in 1. less any relevant existing cover in 2.
4. Final Recommendation
    Here we introduce opinion (and therefore GSM) on the order in which protection will be recommended and the level of cover/benefits recommended for each type of protection.
    If there was no constraint on money/no budget we can assume that the protection identified at 3. would be recommended. However, there is likely to be some kind of constraint, especially with expensive policies such as critical illness and short deferred period income protection.
    At this point, we would require flexibility from GSM (to accommodate different house views and easy configuration of house views) for defining the order through which protection/features/level of cover are reduced.
    This is explained via examples below Budget
    Above, opinion/difference in house views is constrained to point 4. the final recommendation. A key point here is the presumption that there will be a budget/cost constraint. The point in a journey at which this is identified is critical (i.e. asking the client up front is likely to create a bias/anchor to a lower budget, however presenting an ideal state recommendation (3.) before identifying budget may shock the person into thinking protection is prohibitively expensive).
    It is therefore anticipated that this could be a key point of difference between house views/advice propositions; i.e. the point in the journey where budget is established, and the method of establishing budget.
    Some approaches are:
    Asking the client up front in a journey if they have a
        £ budget
        % of income budget
        % of expenditure budget
    Outlining some heuristic or peer group spending level (e.g. generally spending 5% of your income on protection is a minimum, or 10% of expenditure for people like you is generally allocated to protection). This would be a little like the pension contribution rule of thumb: contribute no less than half your age as a % into your pension.
    We should consider:
    some fundamental user experience (UX) research in this area; when is the best point in the process, and what is the best approach to asking this question to optimise for good decision making.
    how do we make this super-configurable, i.e. so the manner in which it is asked can be easily changed, and the point in the process where it is asked can be easily changed for the particular party that is using this system.

EXAMPLE

Age: 30
Income: £3k per month
2 weeks full sick pay
Expenditure: £800 mortgage, £500 essential, £800 discretionary
Savings: £50,000
Mortgage: £300,000 repayment over 25 years
Family: Married with 2 children
Budget: £100 per month
Retirement: age 65
Ideal Recommendation (3.)
Income Protection: £98 per month
    £2,400
    2 week deferred period
    Age 65
    Indexed
    Guaranteed Premiums
Decreasing Term Assurance: £80 per month
    £300,000 for 25 years
    Critical Illness & Life
    Joint Life first death
Family Income Benefit £45 per month:
    £1,300 per month
    Until youngest child is age 21
    Joint life first death
    indexed
    Critical Illness & Life
Contingency Cover (funeral costs/home modifications etc.): £32 per month:
    £50,000
    Life & Critical Illness
    Index Linked
    to age 65
Total Cost: £255, £155 over budget
Approach 1.
1. Remove Contingency cover completely, as this is not essential (−£32, £123 left to reduce)
2. Extend deferred period on income protection to 1 year, as one year income in savings is available to cover short term sickness (−£42, £81 left to reduce)
3. Remove Critical Illness from Family Income Benefit (FIB), as mortgage would be repaid by other policy and income is protected (−£25, £56 left to reduce)
4. Decrease critical illness element of decreasing term to 50% of mortgage, as income protection is in place (−£35, £21 left to reduce)
5. Decrease term on income protection to age 55, as pension income could be drawn and would expect wealth accumulation by this age (−£15, £6 left to reduce)
6. Reduce Cover on Family Income benefit to £900 per month, as some discretionary spend could be reduced if needed (−£5, £1 left to reduce) Approach 2.
1. Remove Contingency cover completely, as this is not essential (−£32, £123 left to reduce)
2. Decrease Critical illness element of decreasing term to 50% of mortgage, as income protection is in place (−£35, £88 left to reduce)
3. Remove Critical Illness from FIB, as mortgage would be repaid by other policy and income is protected (−£25, £63 left to reduce)
4. Reduce Cover on Family Income benefit to £900 per month, as some discretionary spend could be reduced if needed (−£5, £58 left to reduce)
5. Remove joint life first event from decreasing term policy, as client is the main income generator (−£15, £43 left to reduce)
6. Decrease term on income protection to age 55, as pension income could be drawn and would expect wealth accumulation by this age (−£15, £28 left to reduce)
7. Remove indexation from income protection, as capital will accumulate to offset reduced spending power of income (−£10, £18 left to reduce).
8. Extend deferred period on income protection to 6 months, as one year income in savings is available to cover short term sickness (−£25, £3 left to reduce).

Using Weighted Cosine Similarity

Given a small number of initial test cases we want to generate cases that are as different from these test cases as possible so as to map out the advice space optimally. One way of doing this is to look at the summed differences between features (e.g. GSM and Anomaly detection). The problem found with this method is that the cases generated were all extreme cases, that is, for a generated case no feature in the case was middling (for example no generated case had a need for flexibility of 2; there were only cases with 1s or 3s). One way found to give an acceptable diversity in generated cases was using weighted cosine similarity (see e.g. https://en.wikipedia.org/wiki/Cosine_similarity).

Why the Weighted Part?

Not all features are equal in their relevance to a DB transfer decision. Therefore, we want to generate cases that are preferentially dissimilar to the initial test cases in the most important features. We use the advisors' opinions on the features to determine some appropriate weights.

Cosine Similarity Wrt the Model Perspective

Since we do not have enough data to get a good estimate for a distribution for any particular feature, we cannot normalise properly (normalisation is required to do this). As a consequence we used cosine similarity from the model perspective.

1. Randomly generate ~50000-1000000 test cases. Where for each case each feature one gets an index corresponding to one of the feature categories in the GSM.
2. Compute the weighted cosine similarity for all of these generated cases with respect to (wrt) to the initial cases.
3. Pick the case with the minimum cosine similarity from the initial cases.
4. Add the cases to initial test cases
5. Loop through 2-4 until the required number of test cases have been generated This process is computationally intensive.

Now we have a bunch of test cases with indexes corresponding to feature categories but we need to get to actual feature values. For some features the mapping is clear, e.g. need for flexibility is either a 1, 2 or 3. Therefore the index is effectively the value. However, for numerical fields such as capacity for loss etc we have to be more creative. A given category index corresponds to some threshold as well as an indication of whether one must be greater/less than this threshold. In the case where the feature is in a middle category, ie the value has to be > and < two specified thresholds, then we can simply generate a random number between the two thresholds. For edge categories where the value has to be simply less/greater than some threshold we use the min/max from the initial test case data and generate a random number between the less/greater threshold and the min/max from the data.

The problem with this approach is that it assumes there is no interdependence between variables which is actually not always true (interdependence between variables may be implemented in more complex models). For example, critical yields and hurdle rates: by construction critical yield value is always > than hurdle rates. Such validation is not done for the generated test cases. This is just one example, but there are likely many more dependencies between features that are not as clear.

Workstream: Advice (House View) Prototype

Summary

We can establish a DB Transfer 'House View' which is acceptable to all stakeholders (e.g. compliance, risk etc.) and which can be codified sufficiently to facilitate automation.

Objectives

A prototyped automated digital system is created using an adviser's house view, which sufficiently evidences this capability without building the full system.

The prototype produces a solution overview, which is proven via comparison to example case data, to be in line with the adviser House View.

Success Measures:

Passes Minimum Viable Tests; demonstrates that the automated software gives the expected outcome as an adviser would when applying the guideline.

That it performs as we would expect and provides outcomes as we would expect.

We have confidence in the system generating predictable outcomes.

We have understanding of, and there is transparency around, how and why solutions are being arrived at.

Findings

The core organization's View was successfully distilled into an automation model.

The initial intuitive model successfully passed 10 independently created boundary test cases studies prior to calibration (90%).

Following calibration, this success increased to 100% pass rate against created test case studies.

The model was then tested against a bank of test cases derived from recent live advice cases.

The model scored 100% on client outcome and 71% on strong alignment to adviser, with ongoing calibration during the final proof of concept (PoC) development sprint suggesting that this may be further increased.

Initial analysis has confirmed the outcome of these tests supports our anticipations regarding areas for improvement in the model for MvP.

A clear roadmap of enhancements has been highlighted, with key next steps being;

The identification of further test data in target market

Pension Contract & Investment Recommendation house view

Build out remaining elements of RPP (Suitability Report).

Next Steps

Create MvP Suitability Report

Define Pension Contract & Investment Recommendation house view

Prioritise Preferences and Supporting Factors

Figure 32:
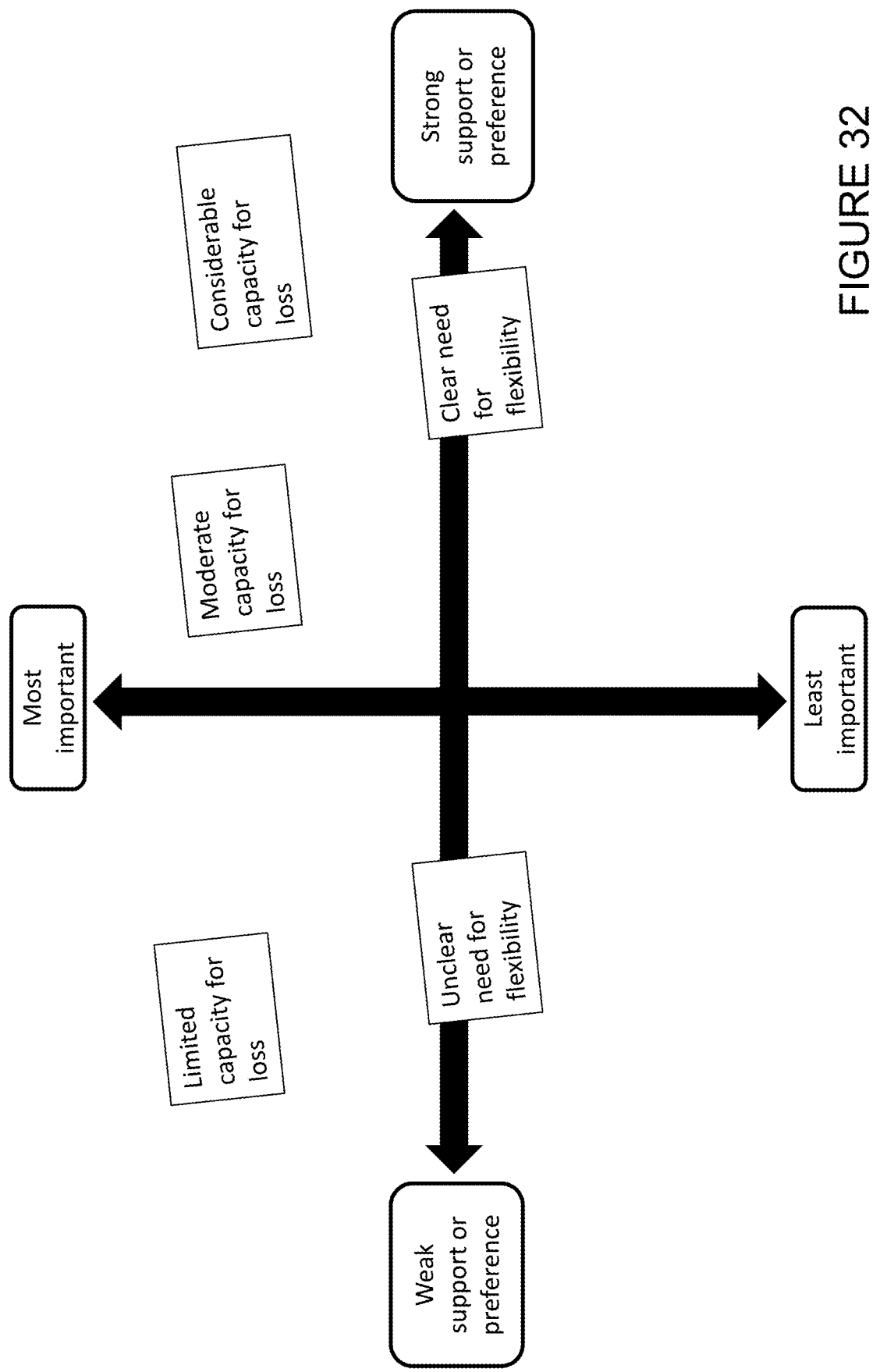
FIG. 32 shows an example of prioritising preferences and supporting factors.

See FIG. 32, for example.

Process: Advice (House View) Prototype, Example
1. Workshop on factors that influence transfer
   A. Prioritise order
   B. Outline of weightings to apply
2. Apply logic and calculations to quantify weightings
3. Build first cut of wizard for initial testing
4. 10 case scenarios to test initial logic
   A. Independent adviser view of likelihood to transfer
   B. View on probability of transfer
   C. Compare probability to wizard score
5. 14 test cases drawn from live recommendations
   A. Focus on 'at the point of taking benefits' but also pre-retirement cases included
   B. Extract data from cases
   C. Input through wizard
   D. Resultant score compared to known advice outcome Factor Model: Advice (House View) Prototype, Example Factors are separated into those with the highest weighting, mid weighting and lower rating. The categories for each factor are defined (e.g. low, medium, high). An example is shown in FIG. 33.

Figure 34A:
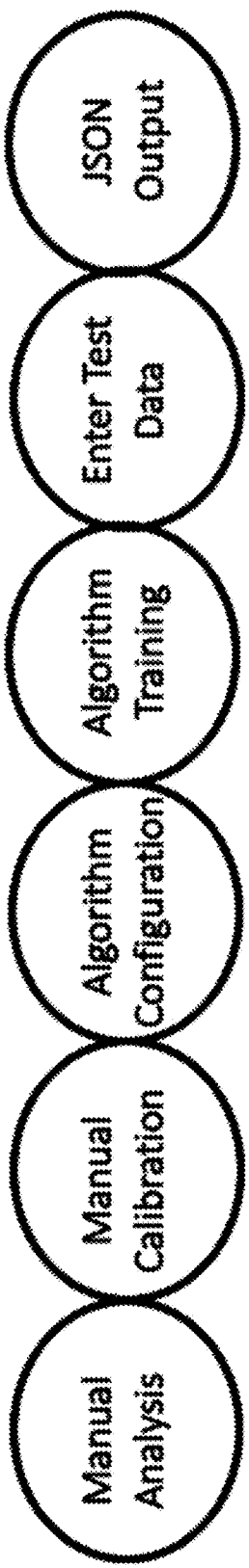
FIG. 34A shows an example of end-to-end house testing.
Figure 34B:
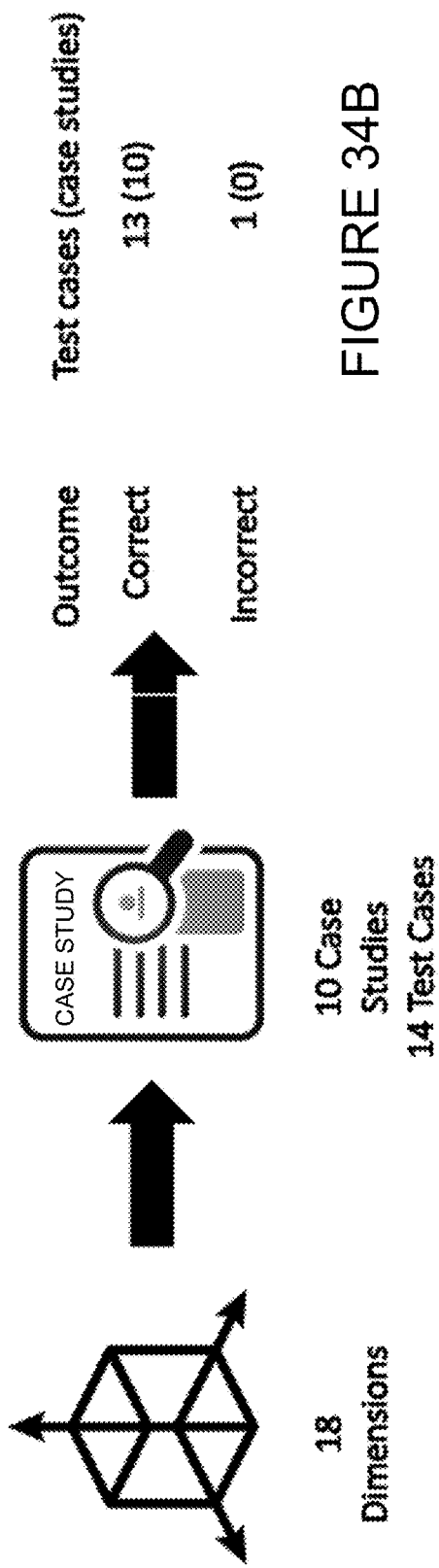
FIG. 34B shows an example of entering and using test data.
Figure 37:
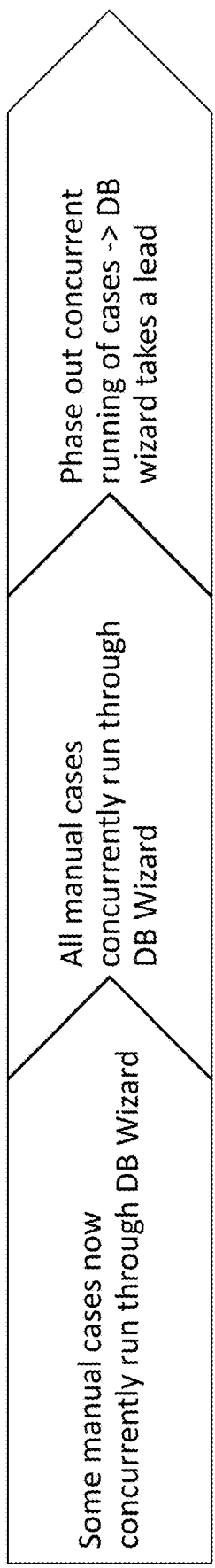
FIG. 37 shows an example of a methodology for enhancement of advice provision.
Figure 38:
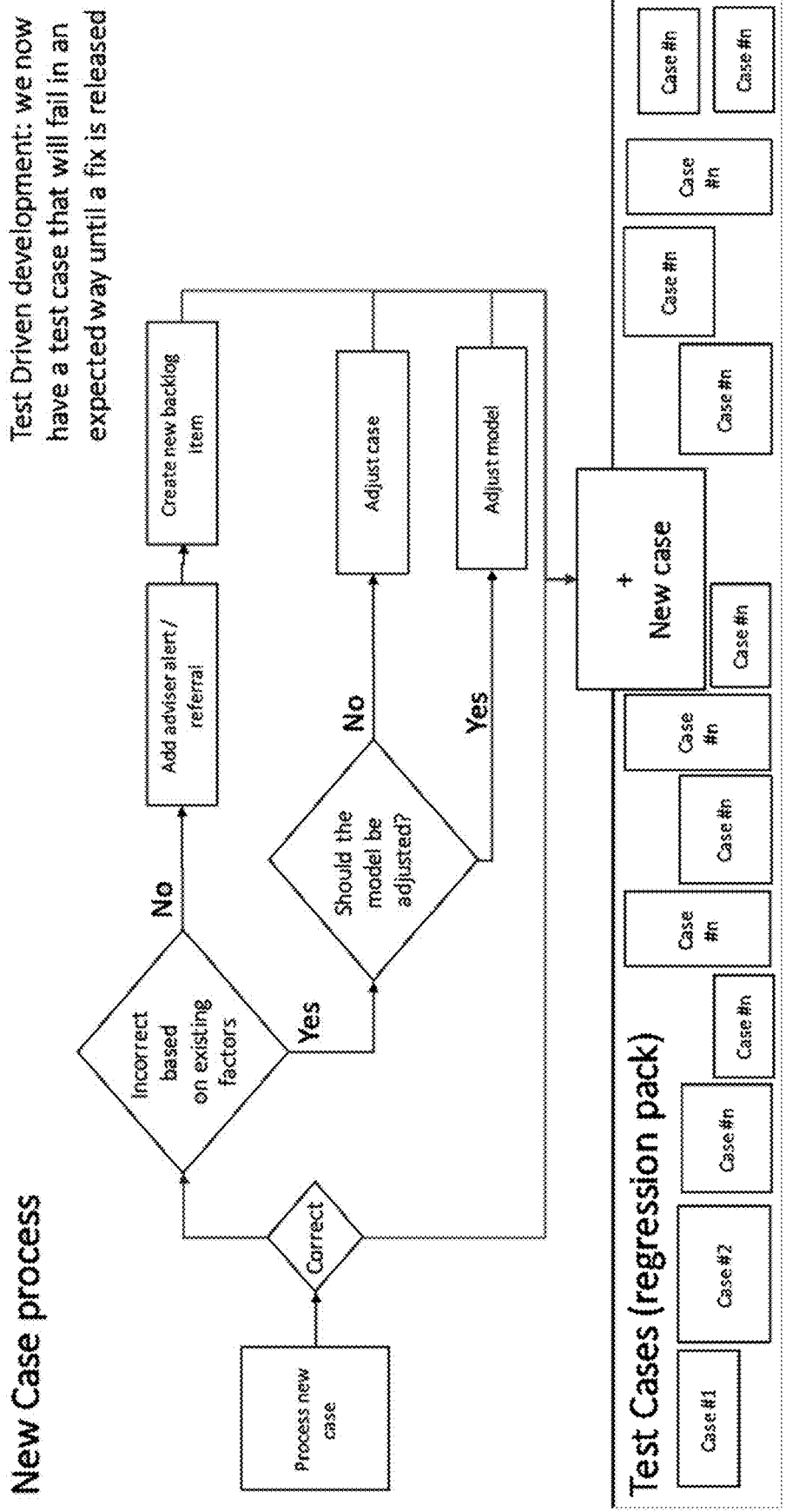
FIG. 38 shows an example of a new case process.
Figure 39:
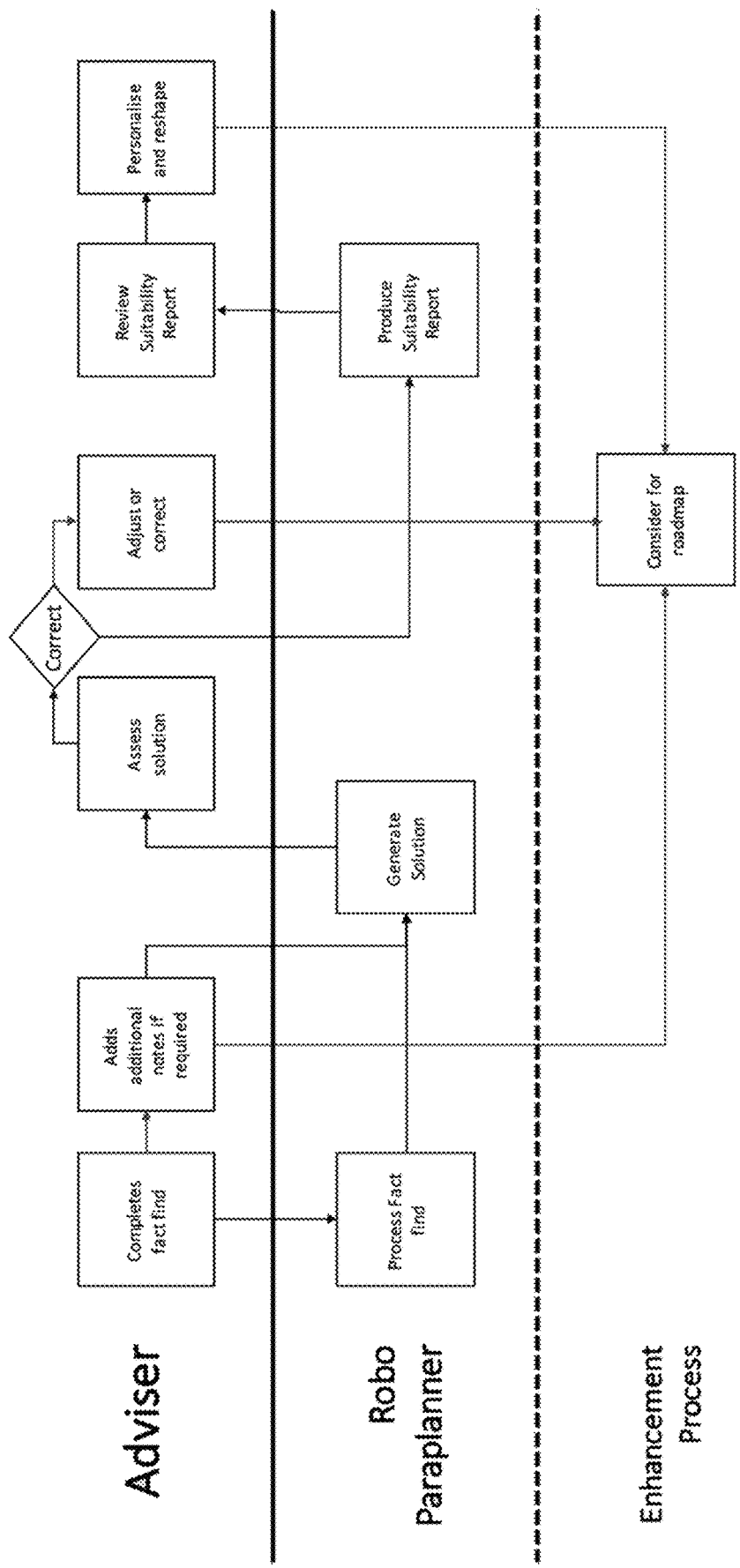
FIG. 39 shows an example of distribution of tasks between an adviser, a robo paraplanner, and an enhancement process.

Detail—Factor: Advice (House View) Prototype, Example
Capacity for Loss
  Quantifying as much as possible using;
  % of income that can be lost
  Other assets—excluding main house
  Other secure income including state pension
  Coverage and security of 'Mandatory' income need versus 'discretionary'
  Financial support offered by spouse/partner
Strength of Case
  If the factors which support a "don't transfer" recommendation outweigh the factors which support a transfer, then the advice system recommends not to transfer.
  If the factors which support a "transfer" recommendation outweigh the factors which support a "don't transfer" recommendation, then the advice system recommends to transfer.
  An example of end-to-end house testing is shown in FIG. 34A. An example of entering and using test data is shown in FIG. 34B.
  In an example, in a table, for each case, an adviser's recommendation is compared with the adviser software's recommendation, and it is evaluated whether the adviser software agreed with the adviser (a "Pass") or not (a "Fail"). An example of test case evaluation is shown in FIG. 35. In the example table of FIG. 35, for each case, the adviser's recommendation is compared with the adviser software's recommendation, and it is evaluated whether the adviser software agreed with the adviser (a "Pass") or not (a "Fail").
  An example of test case evaluation is shown in FIG. 36. In the table, the adviser's recommendation is compared with the adviser software's recommendation. A 'referral' is where the margin for the decision is below a threshold, and hence an adviser is used for the final recommendation. In all cases, the client outcome is "Pass", because in all cases the client either received non-marginal, correct, advice from the advice software, or the client was referred to an adviser, in a marginal case.
Methodology for Enhancement: Advice (House View) Prototype, Example
1. DB Transfer
a) Extend the capability of the DB engine
A. Enhance the depth of existing capability
B. Extend the breadth of factors considered
b) Build the Suitability report
c) Solution Summary (and compliance/audit/reporting)
2. Recommended Pension contract & Investment
  a) House view for DC element of the journey
  b) Build in DC element of the DB Transfer journey
  An example is shown in FIG. 37.
Methodology for Enhancement: Advice (House View) Prototype, Example
Breadth
  Looking for things we are not currently considering
  We already have some of these things (e.g. pension protection fund (PPF))
  Achieve this via case volume
  Next step is mine existing cases for factors outside our model.
  The intention should be to seek cases which break our model
Depth
  Create a deeper bank of information against which we can derive confidence
  Seek cases which fit our target market
  The focus should be getting live so we can run real cases
  Action: early MvP workshop (or activity) amending the existing cases to generate new tests; what can be altered without changing the outcome, at what point does a change become fundamental to the advice
  In an example of a new case process, it is evaluated if the model gives the correct (i.e. advisor approved) advice. If the advice is correct, then the case is added to a test cases regression pack. If the advice is incorrect, then it is evaluated whether or not the advice is incorrect based on existing factors. If the advice not incorrect based on existing factors, then a referral, or adviser alert, is generated, because there is a strong likelihood that the model may need a significant change, such as the incorporation of a new factor, or the modification of an existing factor. If the advice is incorrect based on existing factors, then it should be considered if the model requires adjustment, such as changing the weighting of one or more factors in the model. If the model does not require adjustment, then the case should be adjusted. If the model requires adjustment, then the model is adjusted. In all cases, after the case has been fully processed, the fully processed case is added to the test cases regression pack. An example of a new case process is given in FIG. 38.
  In an example of distribution of tasks between an adviser, a robo paraplanner, and an enhancement process, an adviser completes a fact find. The fact find is provided to the robo paraplanner, which processes the fact find, and then generates a solution. The adviser assesses the solution. If the solution is correct, the case is passed back to the robo paraplanner, which produces a suitability report. The adviser then reviews the suitability report, and may provide personalization and reshaping of the report. The final report is passed to an enhancement process, for consideration in a roadmap.
  When the adviser completes the fact find, the adviser may add additional notes if required, and pass the additional notes to the enhancement process, for consideration in a roadmap.
  If the adviser found that the solution was not correct, the model is adjusted, or the solution is corrected, and the solution is passed to the enhancement process, for consideration in a roadmap.
  An example of distribution of tasks between an adviser, a robo paraplanner, and an enhancement process, is shown in FIG. 39.
How a DB Transfer Wizard can Support Multiple Advice Propositions (Face-to-Face (F2F)/e-Adviser/Digital), Example
1. The advice engine and the fact find are the core elements of the system.
  We seek constant enhancement in the capability of the core system, which delivers improvements across all propositions.
2. We launch with the adviser being the only route through which data can enter the fact find.
  This can be via telephone or face to face meeting.
  Initially, we can rely on skill of the adviser to assist in this process, avoiding any need for early investment in UX.
3. Initially for MvP and for ad-hoc cases, the adviser can complete the fact find in full. However, efficiency and UX improvements can be delivered as we can create mechanisms to pre-populate data (e.g. via direct live system integrations, or more simple bulk uploads).
4. Cases completed by advisers provide opportunities for analysis, from which digital co-browsing tools can be delivered. Initially these help the adviser/client conversation, but over time, these tools will become so effective, the adviser's involvement will be reduced and may be eventually removed from steps of the process.

5. As the capability of the digital co-browsing tools improves, portions of the journey will be completed entirely by the client. Over time, the need for an adviser becoming involved will be rare, for example the adviser only being on hand if the client requests chat/help. At this point, the journey can be considered completely digital.

6. As the engine will initially be launched as part of an adviser lead process, throughout these steps volumes of cases will be tested through the engine, and indeed each digital component can first be tested with clients via advisers, adding control and the opportunity to proceed with confidence.

Figure 40:
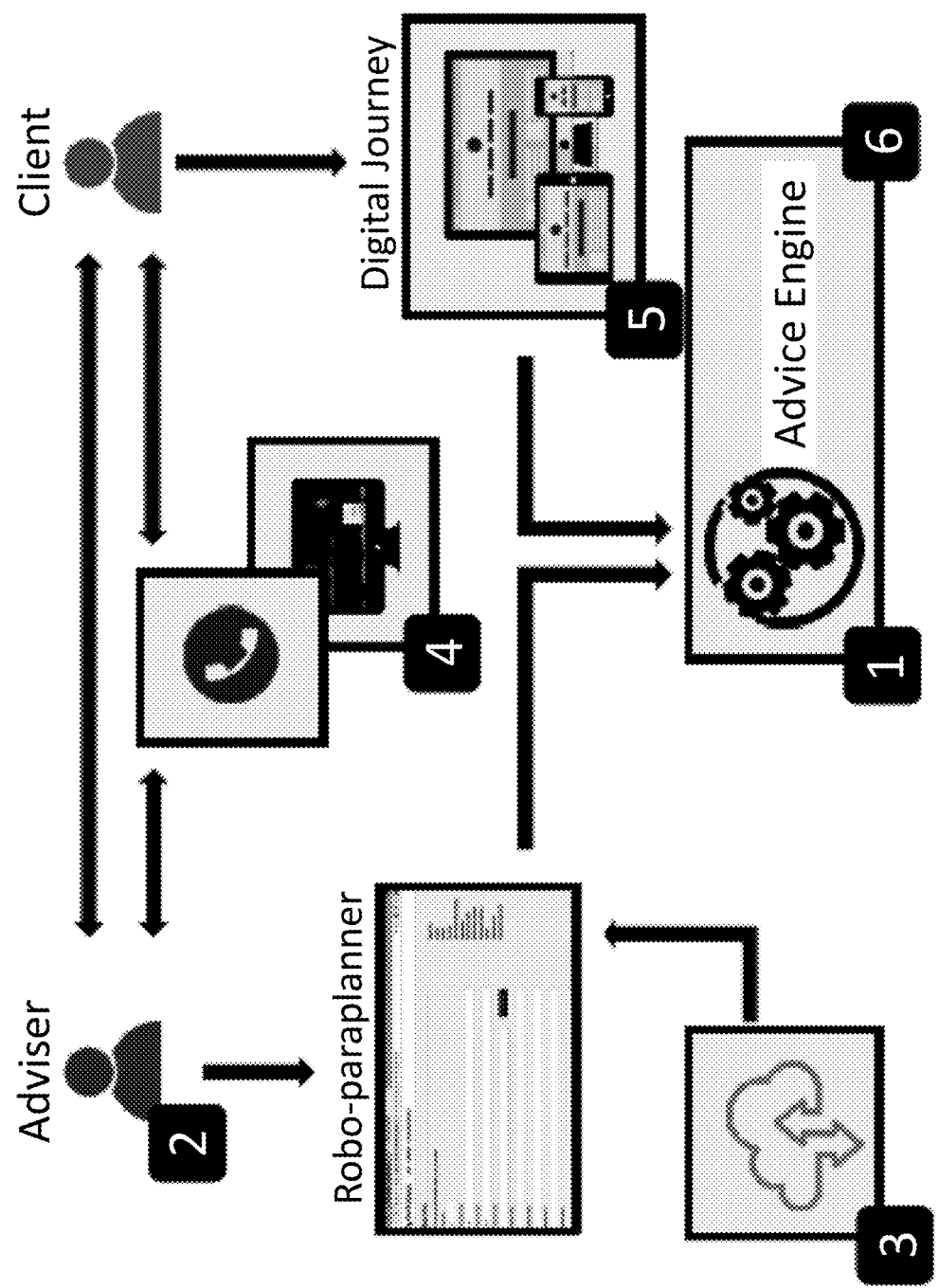
FIG. 40 shows an example of how a DB Transfer Wizard can support multiple advice propositions.

An example is shown in FIG. 40.

Notes on Hybrid Advice

1. Considering that there are both distinct stages to the advice journey, and dimensions of complexity throughout the process; each advice case is likely to be represented at different levels of complexity for each process stage.

2. When launching early, an adviser will offer support in areas of complexity, but will quickly benefit from automation in all routine elements of the process, whilst proving the capability of the system and informing development to more complex areas.

3. As the capability of the system is developed, only the most complex elements of the most complex cases will require adviser support; over time these items can also be considered for automation.

4. Some level of adviser support in a system operating at scale will be required. But this will be restricted to the most complex cases, where complexity and frequency of occurrence would not support a case for automation.

5. It is important to note, that from an early point all cases can and should be completed through the hybrid journey. Where elements of a case require adviser input, this is often a small and isolated part of the overall journey.

Figure 41:
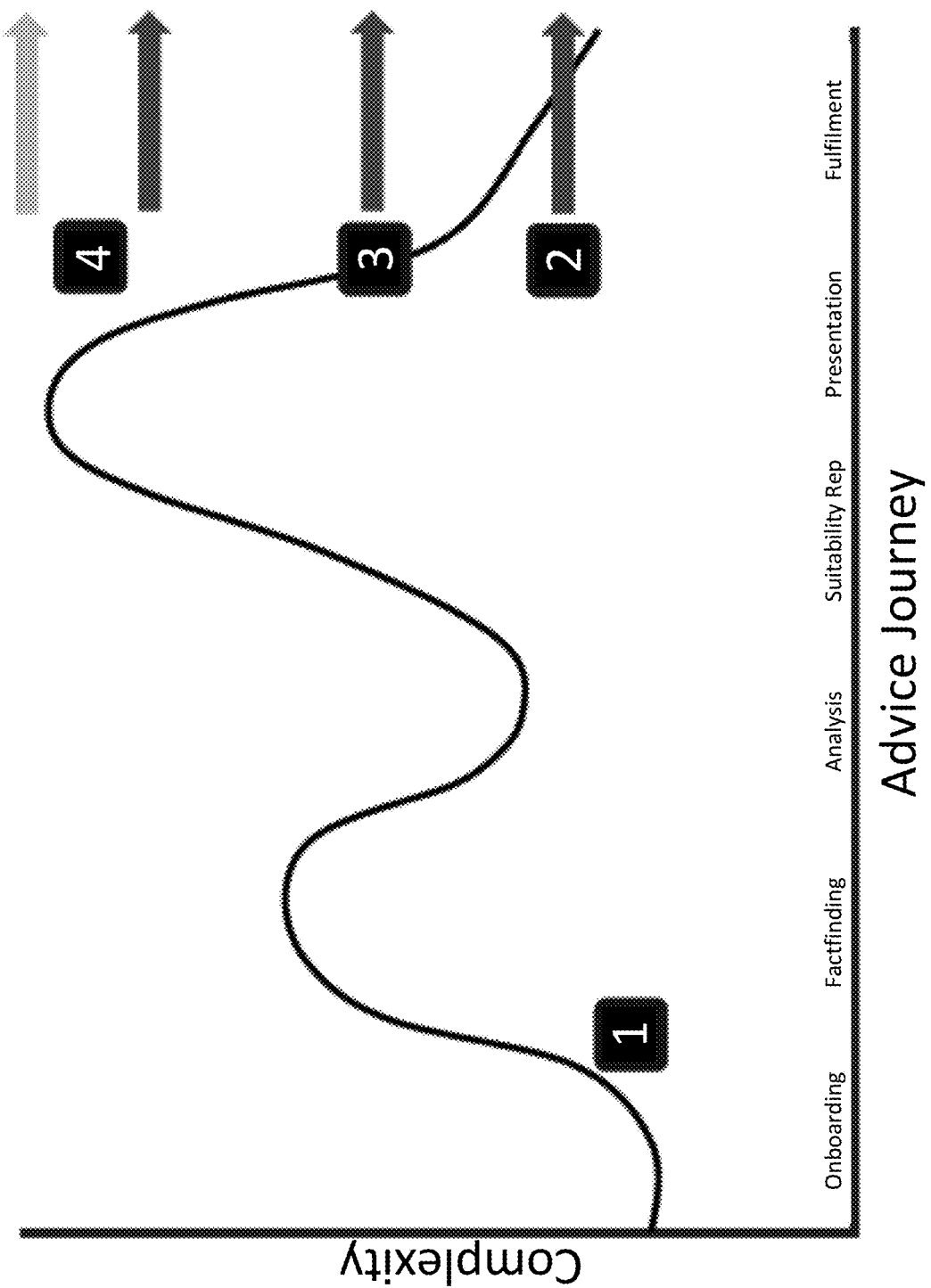
FIG. 41 shows an example of complexity as a function of advice journey.
Figure 48:
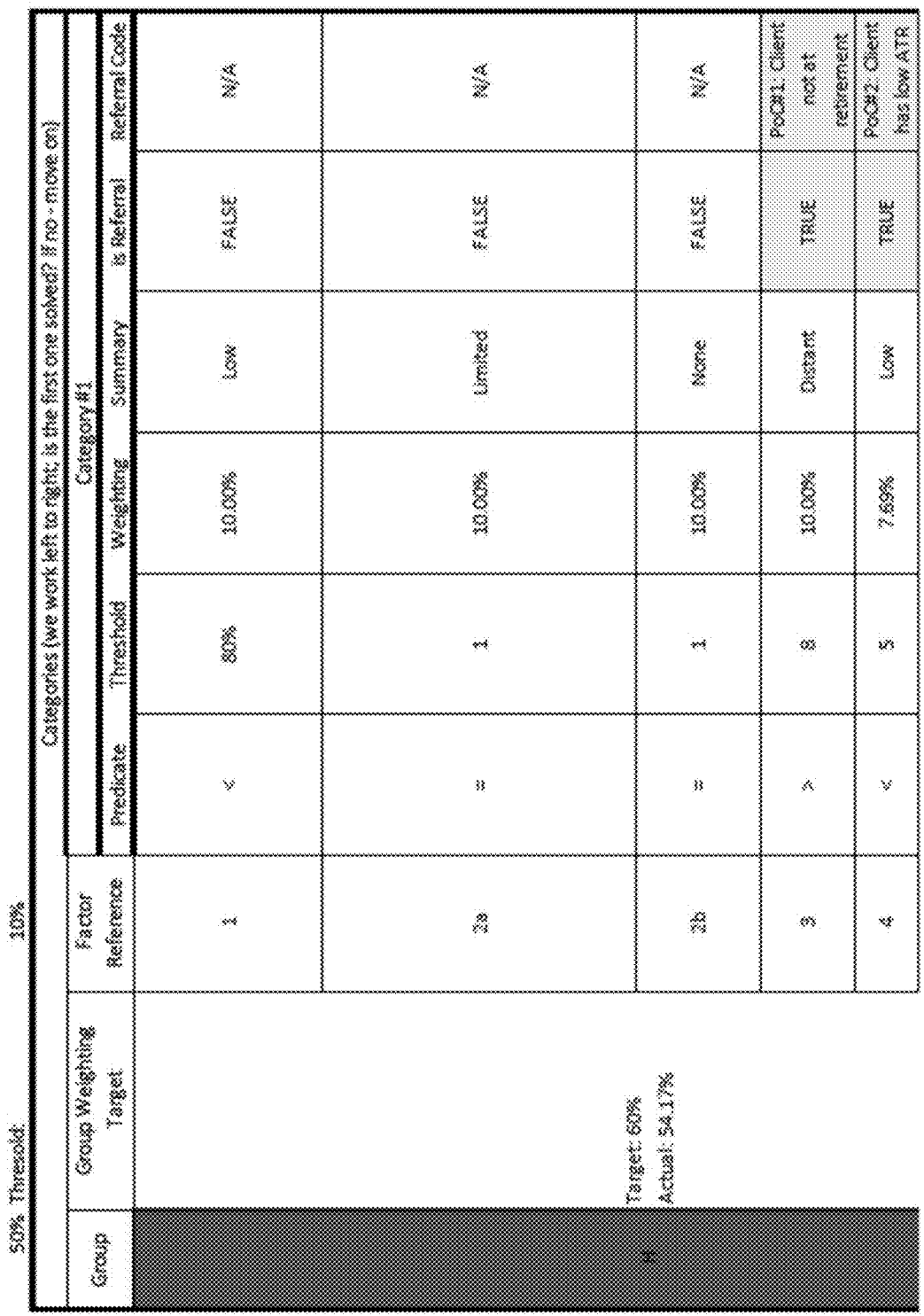

An example is shown in FIG. 41.

Considerations

We know with advising (e.g. for defined benefit pension transfer) we consider a number of different features (or factors) independently, score them, weigh them and derive a yes or no answer regarding whether or not to transfer.

Each feature, or row in a table, has a single data point which gets evaluated. Some of these come straight from the fact find (e.g. value of defined benefit pension).

In some cases, there is a calculation which looks across a few pieces of data in the fact find to create a new, single data point which is used in the model. A calculation is still determining a new piece of data, but it is factual, e.g. "1+2=3": i.e. no judgment is applied.

Some data used in the DB model were things which didn't come straight from the fact find, but they weren't factual either. These were like the DB table, i.e. a decision table, where data points came from the fact find or calculations based on the fact find.

In some cases, items of data in these models are themselves coming from other models (e.g. capacity for loss is a composite of resilience and tolerance).

So we have things in the DB model which come from the fact find, from calculations or from other decisions models. Saying items are feeding into the DB table isn't really completely correct. There is a database in the middle, with the fact find sending data into it. Calculations take data from the database, perform some manipulation and then add some things, as do the decision tables.

Figure 10:
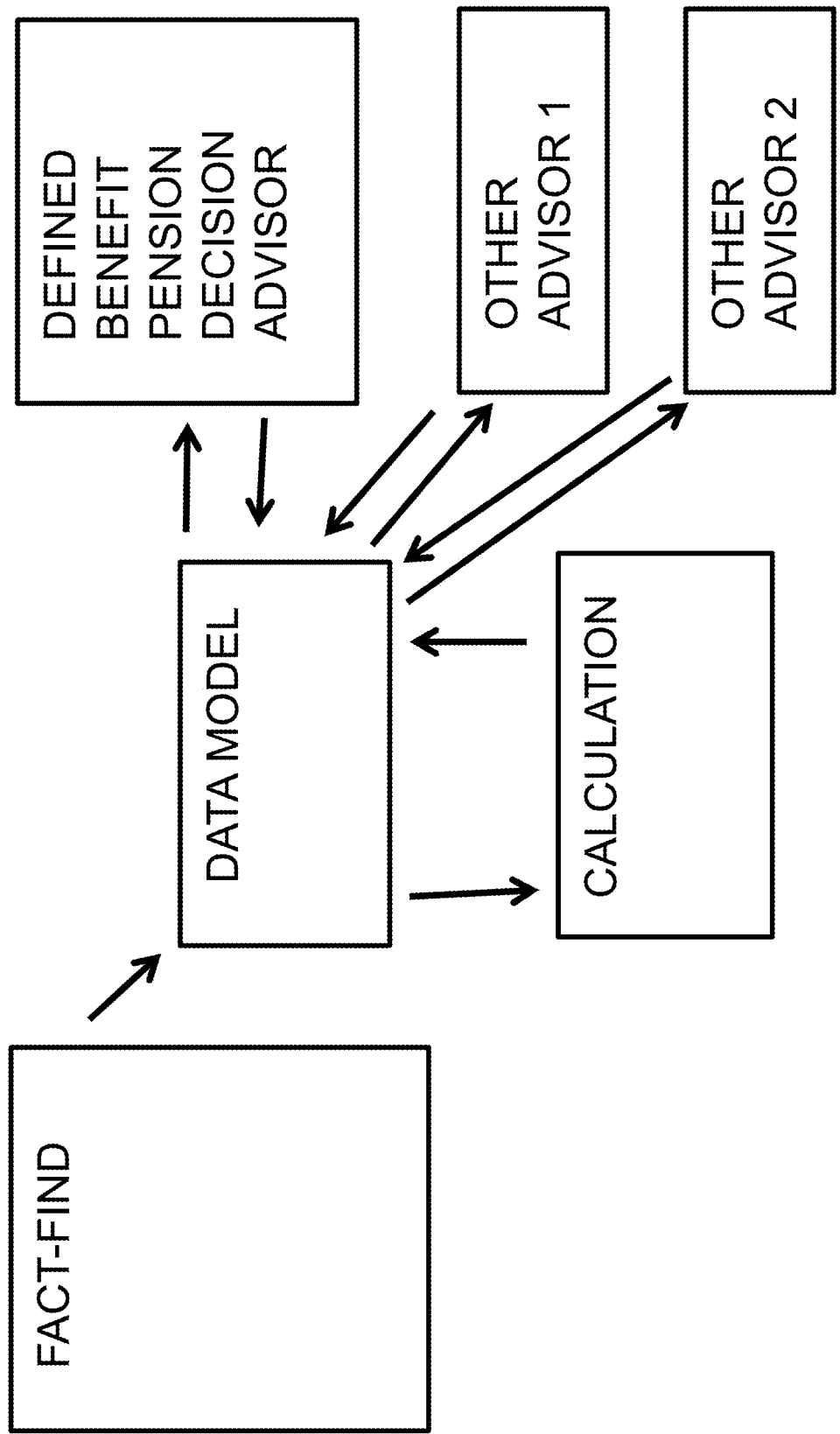
FIG. 10 shows a schematic diagram of an example system and method for providing financial advice.

This implies one can adjust the weights, features, etc. of many or all parts in the system. An example is shown in FIG. 10.

Note

It is to be understood that the above-referenced arrangements are only illustrative of the application for the principles of the present invention. Numerous modifications and alternative arrangements can be devised without departing from the spirit and scope of the present invention. While the present invention has been shown in the drawings and fully described above with particularity and detail in connection with what is presently deemed to be the most practical and preferred example(s) of the invention, it will be apparent to those of ordinary skill in the art that numerous modifications can be made without departing from the principles and concepts of the invention as set forth herein.

The invention claimed is:

1. Computer implemented method of providing automated advice, such as financial advice, the method including the steps of:
   receiving a plurality of factors for use in providing automated advice, each factor including a defined respective set of categories, and each factor and each category including a respective initial weighting;
   (ii) receiving a rule for generating a recommendation using the plurality of factors, and the categories, and using the respective weightings of the plurality of factors and the categories, the rule including a set of possible recommendations, such that a generated recommendation is one of the set of possible recommendations;
   (iii) receiving a plurality of training cases, each training case including inputs relating to each factor of the plurality of factors, and to the categories, and each training case including a respective validated recommendation which is one of the set of possible recommendations;
   (iv) processing the plurality of training cases, to derive a respective optimized weighting for each factor of the plurality of factors, and for each category, to satisfy or to match the respective validated recommendations optimally, using the rule, and
   (v) storing the derived respective optimized weightings for the plurality of factors and for each category;
   (vi) retrieving the stored derived respective optimized weightings for the plurality of factors, and for each category;
   (vii) receiving from a user terminal inputs relating to each factor of the plurality of factors, and to the categories;
   (viii) processing the retrieved derived respective optimized weightings for the plurality of factors, and for each category, together with the received inputs relating to each factor of the plurality of factors, and to the categories, using the rule, to generate a recommendation; and
   (ix) transmitting the recommendation to the user terminal, to provide automated advice.

2. The method of claim 1, including the step of the user terminal receiving the user input, and the user terminal transmitting the received user input for reception in step (vii).

3. The method of claim 1, in which the user terminal is a smartphone, a tablet computer, a mobile device, a laptop computer, a desktop computer, or a smart TV, or a voice control interface device, or a voice control interface device including Amazon Echo.

4. The method of claim 1, in which at least some categories include a category threshold, in which the rule uses the category thresholds, in which the category thresholds are optimized in step (iv), and in which the optimized category thresholds are stored in step (v).

5. The method of claim 1, in which at least some categories include a category threshold, in which the rule uses the category thresholds, in which the category thresholds are optimized in step (iv), in which the optimized category thresholds are stored in step (v), in which stored category thresholds are retrieved in step (vi), and in which the retrieved stored category thresholds are used in the rule, in the processing of step (viii).

6. The method of claim 1, in which each factor and each category includes an explanatory text field, which explains why the respective factor or category is important, if it has been highly scored.

7. The method of claim 1, in which each factor and each category includes an explanatory text field, which explains why the respective factor or category is important, if it has been highly scored, and in which a report is assembled in which the explanatory text fields associated with the most highly scored factors or categories are included, to provide an explanation of why the recommendation has been generated, together with the recommendation.

8. The method of claim 1, in which the outputs and/or workings of calculations or analysis which were completed in the process of generating advice, is provided; or in which the outputs and/or workings of calculations or analysis which were completed in the process of generating advice, is provided in a spreadsheet.

9. The method of claim 1, in which a suitability report is provided which contains detail of the advice given, the reasons for it, and any risks or considerations the client should be aware of in relation to the recommendation and details of the recommendation.

10. The method of claim 1, in which retrieved data is included in one or more CSV files; or in which Category scores are a multiple of their Factor score, and the rule Score is some multiple of the total Factor Scores.

11. The method of claim 1, in which financial advice is provided.

12. The method of claim 11, in which the financial advice provided is income protection advice, or drawdown advice, or pension transfer advice.

13. The method of claim 1, in which the method uses asset sub-totals;
   or in which the method uses one or more of growth rate, inflation rates, or charging rate, in investment growth projections;
   or including the step of using financial data in step (viii).

14. The method of claim 1, in which anomaly detection is performed based on thresholds.

15. The method of claim 14, in which the anomaly detection is performed by identifying which threshold a case lies in for each category and seeing if there is a test case that shares the same thresholds that can be used to check the recommendation; or
   in which anomaly detection is based on proximity, in which the categories are normalised and then the proximity of a live case to a test case is measured and then if the difference is too high the case is referred to an adviser for further processing; or
   in which if there is a test case that shares the same thresholds then a recommendation is issued to a user, otherwise the recommendation is calculated and the case is referred to an adviser for further processing.

16. The method of claim 1, (I) in which the method enables anomalies and outliers to be identified and highlighted for further investigation; or
   (II) in which it is possible to run a complete check on past cases of advice given to identify if there are any anomalies; or
   (III) in which the method includes using examples of good decisions, and the factors which were considered when making them; Artificial Intelligence then completes the work of understanding the basis on which decisions were made; or
   (IV) in which a human expert making recommendations is not required to describe their recommendation-making process, to provide the automated advice; or
   (V) in which past examples are taken of decisions which have been made (and which are known to be right or have been checked as being right) and they are used to understand what makes, or made, a good decision; or
   (VI) in which constraints are imposed on the advice software by providing the items in the fact find which an adviser would deem appropriate to consider in their decision; or
   (VII) in which the advice software is calibrated/trained using past cases; or
   (VIII) in which it is possible to compare a particular adviser within a firm to the firm's house view; or
   (IX) in which a weighted cosine similarity is used to select test cases, to map out an advice space; or
   (X) in which the advice is provided using one or more of voice, chat, emotive robots or computer vision; or
   (XI) in which the advice is provided in other advisory industries; or in which the advice is provided in medical or legal advisory industries.

17. A processor, the processor configured to:
   (i) receive a plurality of factors for use in providing automated advice, each factor including a defined respective set of categories, and each factor and each category including a respective initial weighting;
   (ii) receive a rule for generating a recommendation using the plurality of factors, and the categories, and using the respective weightings of the plurality of factors and the categories, the rule including a set of possible recommendations, such that a generated recommendation is one of the set of possible recommendations;
   (iii) receive a plurality of training cases, each training case including inputs relating to each factor of the plurality of factors, and to the categories, and each training case including a respective validated recommendation which is one of the set of possible recommendations;
   (iv) process the plurality of training cases, to derive a respective optimized weighting for each factor of the plurality of factors, and for each category, to satisfy or to match the respective validated recommendations optimally, using the rule, and
   (v) store the derived respective optimized weightings for the plurality of factors and for each category;
   (vi) retrieve the stored derived respective optimized weightings for the plurality of factors, and for each category;
   (vii) receive from a user terminal inputs relating to each factor of the plurality of factors, and to the categories;
   (viii) process the retrieved derived respective optimized weightings for the plurality of factors, and for each category, together with the received inputs relating to each factor of the plurality of factors, and to the categories, using the rule, to generate a recommendation, and (ix) transmit the recommendation to the user terminal, to provide automated advice.

18. Computer program product embodied on a non-transitory storage medium, the computer program product executable on a processor to:
(i) receive a plurality of factors for use in providing automated advice, each factor including a defined respective set of categories, and each factor and each category including a respective initial weighting;
(ii) receive a rule for generating a recommendation using the plurality of factors, and the categories, and using the respective weightings of the plurality of factors and the categories, the rule including a set of possible recommendations, such that a generated recommendation is one of the set of possible recommendations;
(iii) receive a plurality of training cases, each training case including inputs relating to each factor of the plurality of factors, and to the categories, and each training case including a respective validated recommendation which is one of the set of possible recommendations;
(iv) process the plurality of training cases, to derive a respective optimized weighting for each factor of the plurality of factors, and for each category, to satisfy or to match the respective validated recommendations optimally, using the rule, and
(v) store the derived respective optimized weightings for the plurality of factors and for each category;
(vi) retrieve the stored derived respective optimized weightings for the plurality of factors, and for each category;
(vii) receive from a user terminal inputs relating to each factor of the plurality of factors, and to the categories;
(viii) process the retrieved derived respective optimized weightings for the plurality of factors, and for each category, together with the received inputs relating to each factor of the plurality of factors, and to the categories, using the rule, to generate a recommendation, and
(ix) transmit the recommendation to the user terminal, to provide automated advice.

19. A computer implemented method of providing automated advice, such as financial advice, the method including the steps of:
(i) receiving a plurality of factors for use in providing automated advice, each factor including a defined respective set of categories, and each factor and each category including a respective initial weighting;
(ii) receiving a rule for generating a recommendation using the plurality of factors, and the categories, and using the respective weightings of the plurality of factors and the categories, the rule including a set of possible recommendations, such that a generated recommendation is one of the set of possible recommendations;
(iii) receiving a plurality of training cases, each training case including inputs relating to each factor of the plurality of factors, and to the categories, and each training case including a respective validated recommendation which is one of the set of possible recommendations;
(iv) processing the plurality of training cases, to derive a respective optimized weighting for each factor of the plurality of factors, and for each category, to satisfy or to match the respective validated recommendations optimally, using the rule, and
(v) storing the derived respective optimized weightings for the plurality of factors and for each category;
(vi) retrieving the stored derived respective optimized weightings for the plurality of factors, and for each category;
(vii) receiving from a user terminal inputs relating to each factor of the plurality of factors, and to the categories;
(viii) processing the retrieved derived respective optimized weightings for the plurality of factors, and for each category, together with the received inputs relating to each factor of the plurality of factors, and to the categories, using the rule, the rule including scoring, to generate a score and a recommendation relating to the score, and
(ix) if the score is within a predefined range, transmitting the score and the recommendation to an adviser for further consideration, and if the score is outside the predefined range, transmitting the recommendation to the user terminal, to provide automated advice.

* * * * *